United States Patent
Yako et al.

(10) Patent No.: US 12,293,522 B2
(45) Date of Patent: May 6, 2025

(54) SIGNAL PROCESSING METHOD, SIGNAL PROCESSING DEVICE, AND IMAGING SYSTEM

(71) Applicant: Panasonic Intellectual Property Management Co., Ltd., Osaka (JP)

(72) Inventors: Motoki Yako, Osaka (JP); Atsushi Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 192 days.

(21) Appl. No.: 18/058,043

(22) Filed: Nov. 22, 2022

(65) Prior Publication Data

US 2023/0079297 A1  Mar. 16, 2023

Related U.S. Application Data

(63) Continuation of application No. PCT/JP2021/019288, filed on May 21, 2021.

(30) Foreign Application Priority Data

Jun. 5, 2020  (JP) .................................. 2020-098415

(51) Int. Cl.
    *G06T 7/11*        (2017.01)
    *G06T 7/12*        (2017.01)
    *H04N 23/11*     (2023.01)

(52) U.S. Cl.
    CPC .................. *G06T 7/11* (2017.01); *G06T 7/12* (2017.01); *H04N 23/11* (2023.01); *G06T 2207/10036* (2013.01); *G06T 2207/20104* (2013.01)

(58) Field of Classification Search
CPC ... G06T 7/11; G06T 7/12; G06T 2207/10036; G06T 2207/20104; H04N 23/11;
(Continued)

(56) References Cited

U.S. PATENT DOCUMENTS

| | | | |
|---|---|---|---|
| 2009/0220154 A1* | 9/2009 | Daidoh | G06V 30/155 382/182 |
| 2016/0138975 A1 | 5/2016 | Ando et al. | |
| 2021/0266478 A1* | 8/2021 | Nagumo | H04N 23/60 |

FOREIGN PATENT DOCUMENTS

WO    2016/012980    1/2016

OTHER PUBLICATIONS

International Search Report of PCT application No. PCT/JP2021/019288 dated Jul. 20, 2021.

\* cited by examiner

*Primary Examiner* — Ahmed A Berhan
(74) *Attorney, Agent, or Firm* — Wenderoth, Lind & Ponack, L.L.P.

(57) ABSTRACT

A signal processing method is performed by a computer. The signal processing method includes: obtaining first compressed image data including hyperspectral information and indicating a two-dimensional image in which the hyperspectral information is compressed, the hyperspectral information being luminance information on each of at least four wavelength bands included in a target wavelength range; extracting partial image data from the first compressed image data; and generating first two-dimensional image data corresponding to a first wavelength band and second two-dimensional image data corresponding to a second wavelength band from the partial image data.

17 Claims, 22 Drawing Sheets

(58) Field of Classification Search
CPC .......... H04N 23/10; H04N 23/54; H04N 1/64; H04N 23/60; G01J 2003/2826; G01J 2003/283; G01J 2003/2836; G01J 2003/284; G01J 3/2823; G01J 3/36
See application file for complete search history.

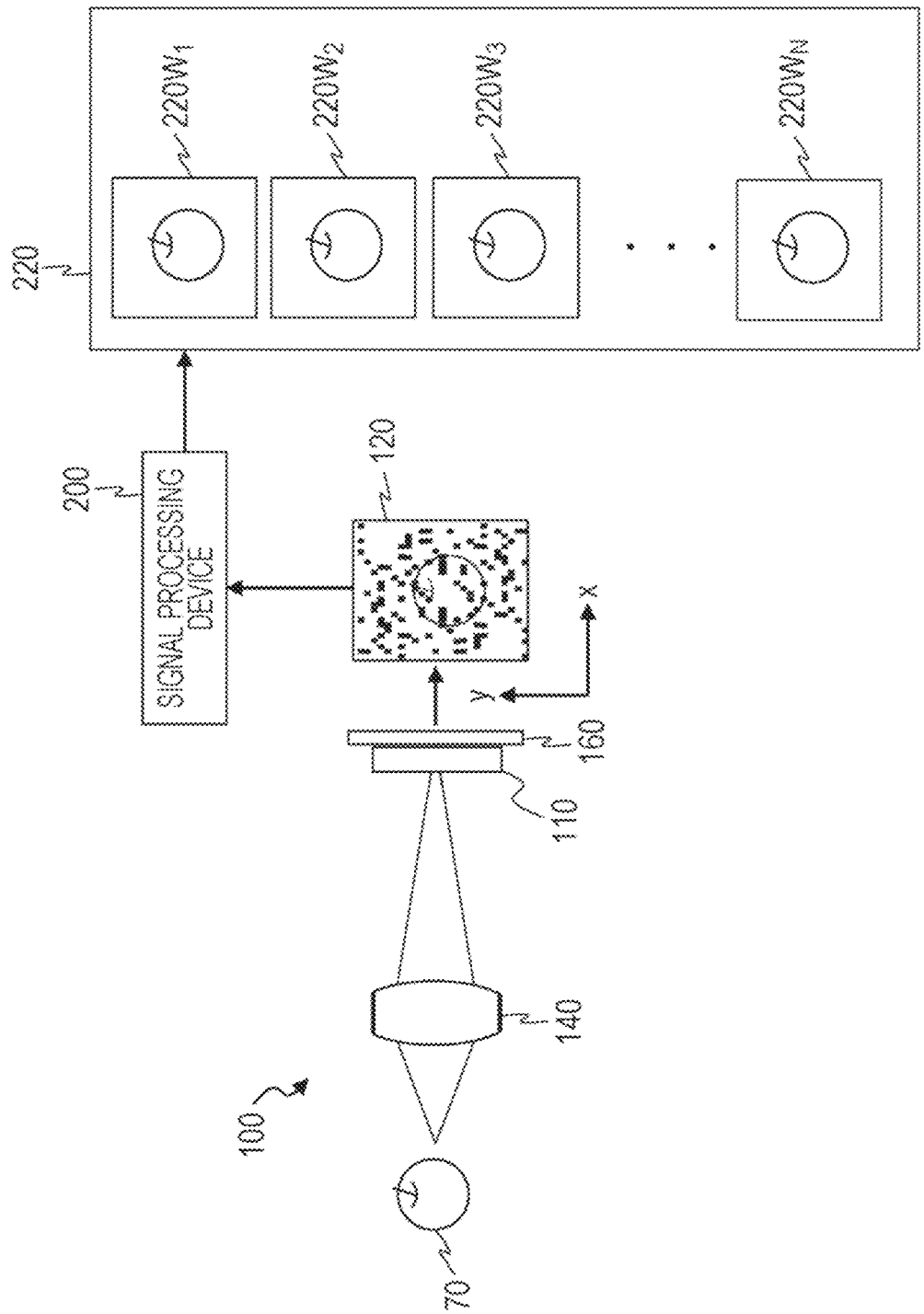

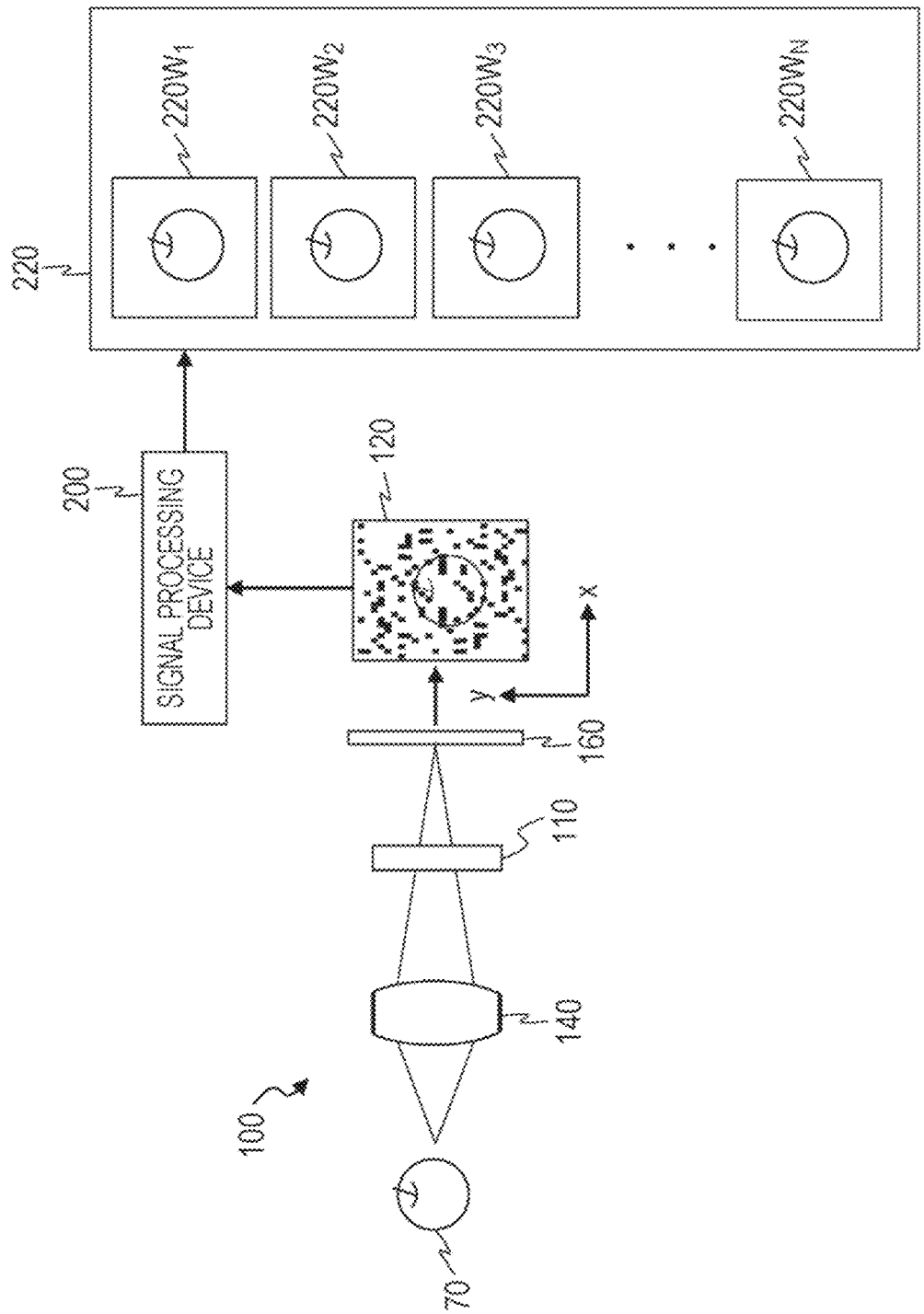

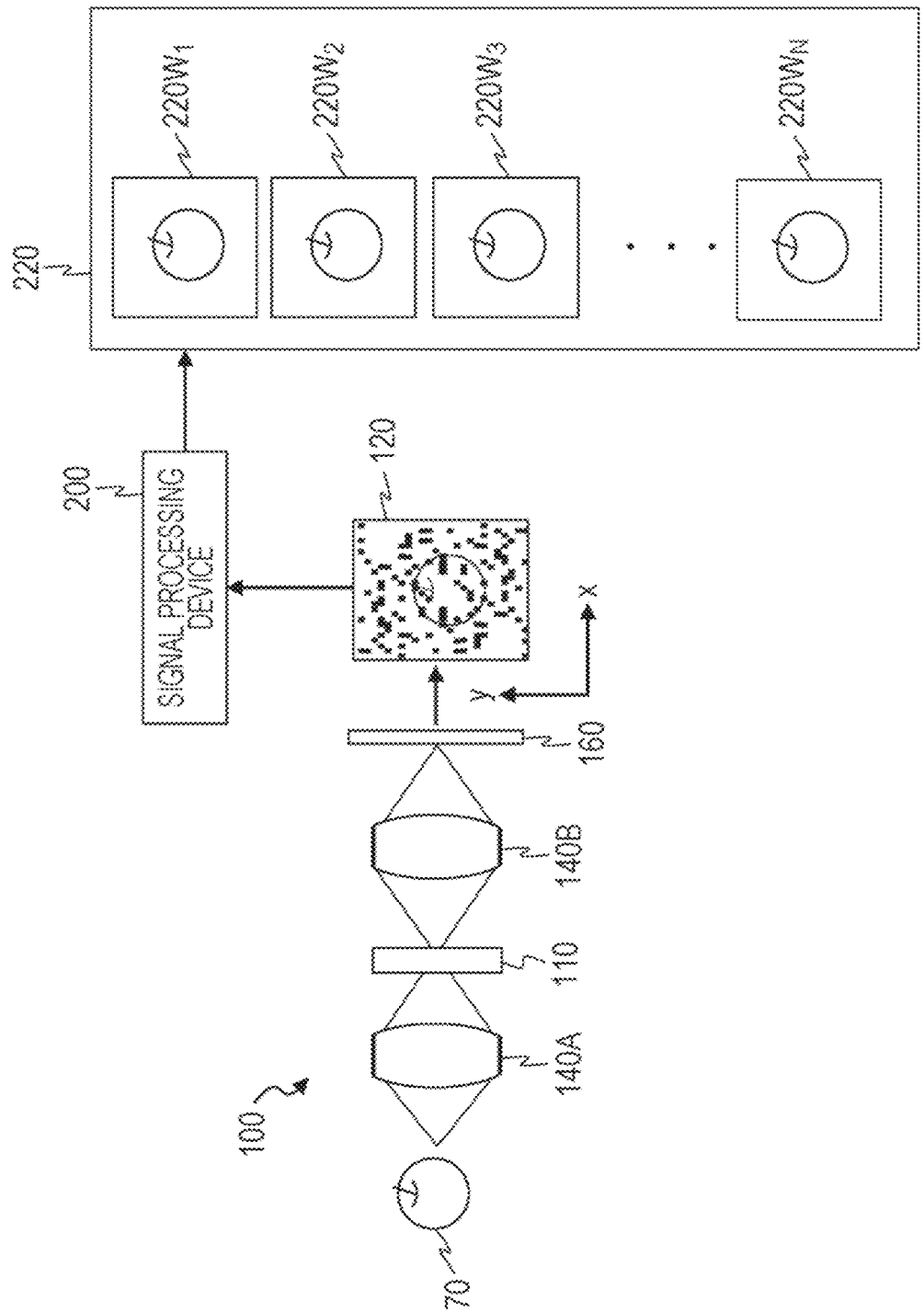

SIGNAL PROCESSING METHOD, SIGNAL PROCESSING DEVICE, AND IMAGING SYSTEM

BACKGROUND

1. Technical Field

The present disclosure relates to a signal processing method, a signal processing device and an imaging system.

2. Description of the Related Art

Application of spectrum information with a large number of bands, for example, several tens of bands, each of which is a narrow band enables a user to grasp detailed physical properties of an object, which has been impossible with an RGB image in the related art. A camera that obtains such information with multiple wavelengths is called a "hyperspectral camera". The hyperspectral cameras are utilized in various fields such as food inspection, biopsy, drug development, and mineral component analysis.

International Publication No. 2016/012980 and U.S. Pat. No. 9,599,511 disclose examples of imaging devices that obtain a hyperspectral image using compressive sensing. The imaging devices disclosed in International Publication No. 2016/012980 and U.S. Pat. No. 9,599,511 include an array of optical filters with transmission spectra different from each other on an optical path between a subject and an image sensor. In International Publication No. 2016/012980, spatial compressive sensing is performed mainly using a single-mode interference filter array. In contrast, in U.S. Pat. No. 9,599,511, compressive sensing for wavelength information is performed using a multi-mode interference filter array. The methods disclosed in International Publication No. 2016/012980 and U.S. Pat. No. 9,599,511 have features in that a hyperspectral image is generated from a compressed image including compressed hyperspectral information. Such methods are superior to other methods in terms of resolution and time required for imaging.

SUMMARY

One non-limiting and exemplary embodiment provides a technique to reduce the amount of calculation and time required to generate a hyperspectral image.

In one general aspect, the techniques disclosed here feature a signal processing method according to an aspect of the present disclosure. The signal processing method is to be performed by a computer, and includes: obtaining first compressed image data including hyperspectral information and indicating a two-dimensional image in which the hyperspectral information is compressed, the hyperspectral information being luminance information on each of at least four wavelength bands included in a target wavelength range; extracting partial image data from the first compressed image data; and generating first two-dimensional image data corresponding to a first wavelength band and second two-dimensional image data corresponding to a second wavelength band from the partial image data.

It should be noted that general or specific embodiments of the present disclosure may be implemented as a system, an apparatus, a method, an integrated circuit, a computer program, a storage medium such as a computer-readable recording disc, or any selective combination thereof. The computer-readable recording disc may include, for example, a non-volatile recording medium such as a compact disc-read only memory (CD-ROM). The apparatus may be comprised of one or more apparatuses. When the apparatus is comprised of two or more apparatuses, the two or more apparatuses may be disposed within one machine, or within two or more separate machines in a distributed manner. In the scope of the present specification and the appended claims, an "apparatus" can refer to not only one apparatus, but also a system comprised of apparatuses.

According to an aspect of the present disclosure, the amount of calculation and time required to generate a hyperspectral image can be reduced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1A is a view schematically illustrating an exemplary hyperspectral imaging system;

FIG. 1B is a view schematically illustrating a first modification of the exemplary hyperspectral imaging system:

FIG. 1D is a view schematically illustrating a third modification of the exemplary hyperspectral imaging system;

DETAILED DESCRIPTIONS

Figure 1C:
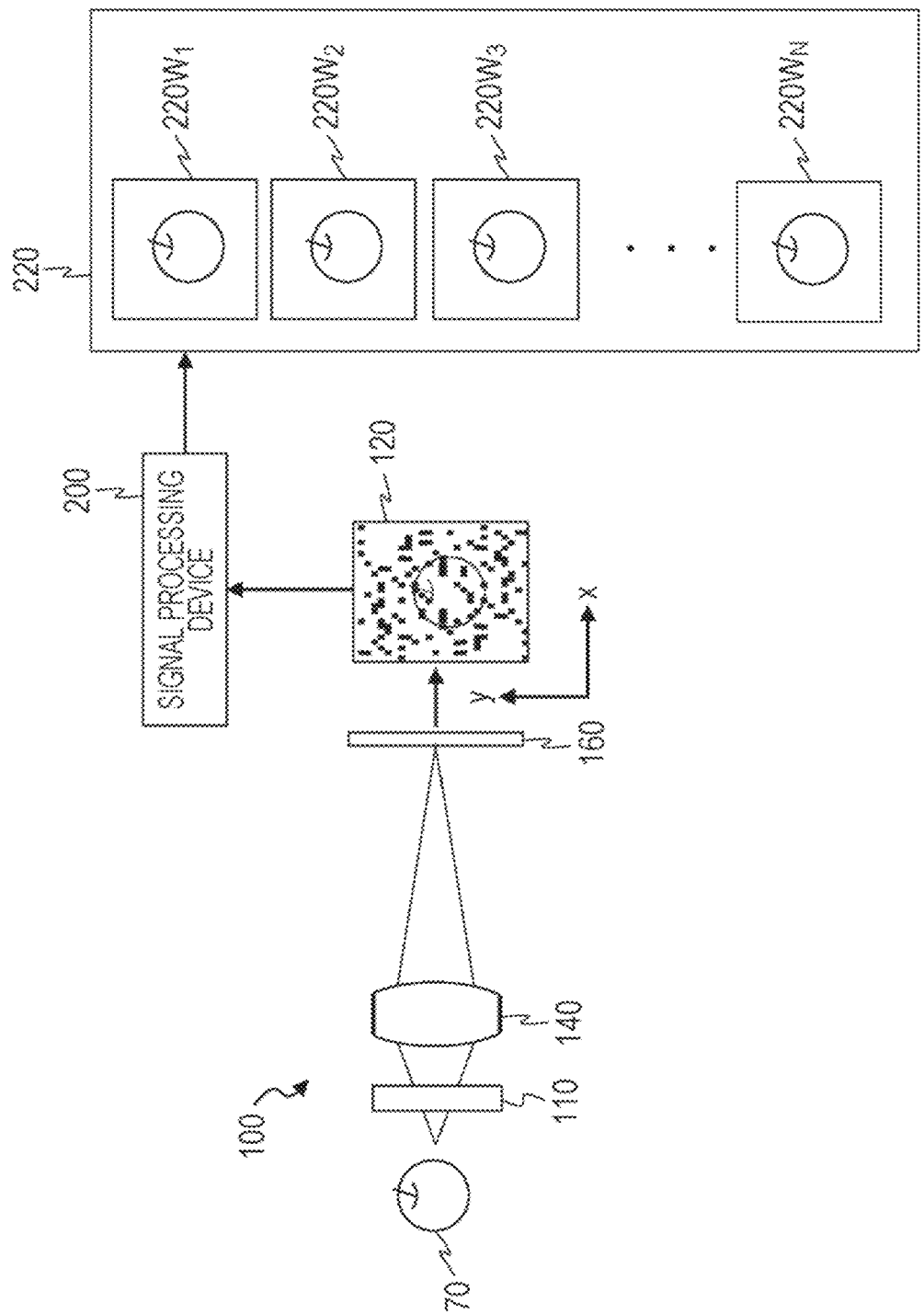
FIG. 1C is a view schematically illustrating a second modification of the exemplary hyperspectral imaging system.

The embodiments described below each show a general or specific example. The numerical values, shapes, materials, components, arrangement, positions and connection topologies of the components, steps, the order of the steps which are shown in the following embodiments are examples, and not intended to limit the technique of the present disclosure. Of the components of the embodiments below, those not described in the independent claim that defines the most generic concept are each described as an arbitrary component. It should be noted that the drawings are schematically illustrated, and are not necessarily illustrated accurately. In addition, substantially the same or similar components are labeled with the same symbol in the drawings. A redundant description may be omitted or simplified.

In the present disclosure, all or part of a circuit, a unit, an apparatus, a member or a component, or all or part of a functional block in a block diagram may be executed by one or more electronic circuits including, for example, a semiconductor device, a semiconductor integrated circuit (IC) or large-scale integration (LSI). LSIs or ICs may be integrated in one chip, or may be comprised of chips combined. For example, the functional blocks other than a storage device may be integrated in one chip. Herein, a relevant component is referred to as LSI or IC, however, may be referred to as system LSI, very large-scale integration (VLSI), or ultra large-scale integration (ULSI) depending on the degree of integration. A field programmable gate array (FPGA) programed after LSI is manufactured, and a reconfigurable logic device which allows reconfiguration of a connection relationship inside LSI or setup of a circuit division inside LSI also can be used for the same purpose.

In addition, the function or operation of all or part of a circuit, a unit, an apparatus, a member or a component can be performed by software processing. In this case, when the software is recorded on a non-transitory recording medium such as one or more ROMs, an optical disc, a hard disk drive, and is executed by a processing device (processor), the function specific to the software is performed by a processing device and a peripheral device. The system or the apparatus may include one or more non-transitory recording media on which software is recorded, a processing device, and a required hardware device, for example, an interface.

First, a configuration example of a hyperspectral imaging system according to an embodiment of the present disclosure and the knowledge found by the inventors will be described.

FIG. 1A is a view schematically illustrating an exemplary hyperspectral imaging system. The system includes an imaging device 100 and a signal processing device 200. The imaging device 100 has the same configuration as that of the imaging device disclosed in U.S. Pat. No. 9,599,511. The imaging device 100 includes an optical system 140, a filter array 110, and an image sensor 160. The filter array 110 has the same structure and function as those of the "encoder" disclosed in U.S. Pat. No. 9,599,511. The optical system 140 and the filter array 110 are disposed on an optical path of light incident from an object 70 which is a subject. The filter array 110 is disposed between the optical system 140 and the image sensor 160.

FIG. 1A illustrates an apple as an example of the object 70. The object 70 is not limited to an apple and may be an arbitrary object. The image sensor 160 generates data of a compressed image 120 in which information on wavelength bands is compressed as a two-dimensional monochrome image. The signal processing device 200 generates image data for each of the wavelength bands included in a target wavelength range based on the data of the compressed image 120 generated by the image sensor 160. The generated image data in wavelength bands is referred to as the "hyperspectral image data" in the present specification. Let N (N is an integer greater than or equal to 4) be the number of wavelength bands included in a target wavelength range. In the following description, the generated image data in wavelength bands is referred to as hyperspectral images $220W_1, 220W_2, \ldots, 220W_N$, and these are collectively referred to as a hyperspectral image 220. In the present specification, signals representing an image, in other words, a set of signals representing the pixel values of pixels may be simply referred to as an "image".

The filter array 110 is an array of filters having translucency, arranged in rows and columns. The filters include several types of filters which vary in wavelength dependence of spectral transmission rate, that is, light transmission rate. The filter array 110 modulates and outputs the intensity of incident light for each wavelength. This process performed by the filter array 110 is referred to as "encoding" in the present specification.

In the example illustrated in FIG. 1A, the filter array 110 is disposed in the vicinity or right above the image sensor 160. Here, "in the vicinity" means close enough so that the image of light from the optical system 140 is formed on the surface of the filter array 110 in a state of being clear to some extent. The "right above" means that both are close to each other so that almost no space therebetween. The filter array 110 and the image sensor 160 may be integrated.

The optical system 140 includes at least one lens. In FIG. 1A, the optical system 140 is shown as one lens; however, the optical system 140 may be a combination of lenses. The optical system 140 forms an image on the imaging surface of the image sensor 160 through the filter array 110.

The filter array 110 may be disposed away from the image sensor 160. FIG. 1B to FIG. 1D each illustrate a configuration example of the imaging device 100, in which the filter array 110 is disposed away from the image sensor 160. In the example of FIG. 1B, the filter array 110 is disposed between the optical system 140 and the image sensor 160 and at a position away from the image sensor 160. In the example of FIG. 1C, the filter array 110 is disposed between the object 70 and optical system 140. In the example of FIG. 1D, the imaging device 100 includes two optical systems 140A and 140B, and the filter array 110 is disposed therebetween. As in these examples, an optical system including one or more lenses may be disposed between the filter array 110 and the image sensor 160.

The image sensor 160 is a monochrome photodetector having light detection devices (also referred to as "pixels" in the present specification) arranged two-dimensionally. The image sensor 160 may be, for example, a charge-coupled device (CCD), a complementary metal oxide semiconductor (CMOS) sensor, an infrared array sensor, a terahertz array sensor or a millimeter wave array sensor. A light detection device includes, for example, a photodiode. The image sensor 160 is not necessarily a monochrome sensor. For example, a color sensor having a R/G/B, R/G/B/IR, or R/G/B/W filter may be used. Use of a color sensor can increase the amount of information on wavelength and improve the accuracy of reconstruction of the hyperspectral image 220. The wavelength range to be obtained may be determined arbitrarily, and may be a wavelength range of ultraviolet, near-infrared, mid-infrared, or far-infrared rays, microwave or radio wave without being limited to a visible wavelength range.

The signal processing device 200 is a computer including a processor and a storage medium such as a memory. The signal processing device 200 generates data of hyperspectral images $220W_1$, $220W_2$, . . . $220W_N$ including respective pieces of information on wavelength bands based on the compressed image 120 obtained by the image sensor 160.

Figure 2A:
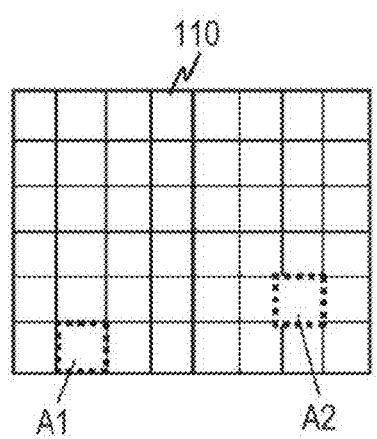
FIG. 2A is a view schematically illustrating an example of a filter array.

FIG. 2A is a view schematically illustrating an example of the filter array 110. The filter array 110 has areas arranged two-dimensionally. In the present specification, the areas may be referred to as the "cells". In each area, an optical filter having an individually set spectral transmission rate is disposed. The spectral transmission rate is represented by function $T(\lambda)$, where $\lambda$ is the wavelength of incident light. The spectral transmission rate $T(\lambda)$ may have a value greater than or equal to 0 and less than or equal to 1.

In the example illustrated in FIG. 2A, the filter array 110 has 48 rectangular areas arranged in six rows and eight columns. This is just for illustration only, and in a practical application, more than 48 areas may be provided. The number may be comparable to the number of pixels of the image sensor 160, for example. The number of filters included in the filter array 110 is determined, for example, in a range from several tens to several tens of millions according to the application.

Figure 2B:
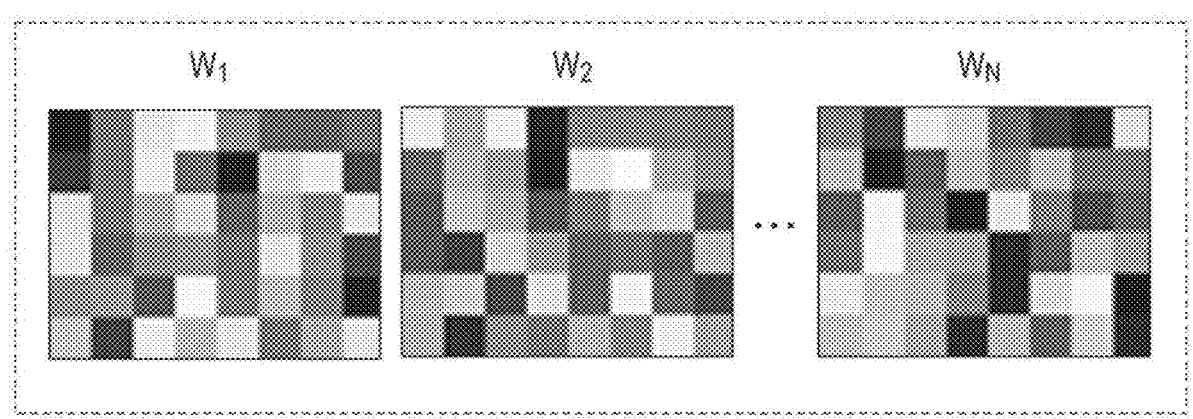
FIG. 2B is a view illustrating an example of a spatial distribution of respective transmission rates of light in wavelength bands $W_1, W_2, \ldots, W_N$ included in a target wavelength range.

FIG. 2B is a view illustrating an example of a spatial distribution of respective transmission rates of light in wavelength bands $W_1$, $W_2$, . . . , $W_N$ included in a target wavelength range. In the example illustrated in FIG. 2B, the difference in grayscale between the areas indicates the difference in transmission rate. A lighter gray area has a higher transmission rate, and a darker gray area has a lower transmission rate. As illustrated in FIG. 2B, the spatial distribution of light transmission rates varies with the wavelength band.

Figure 2C:
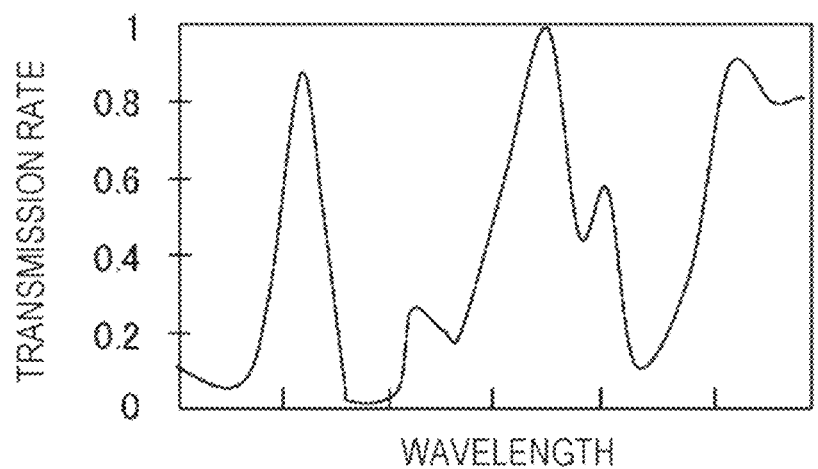
FIG. 2C is a graph illustrating an example of a spectral transmission rate of an area A1 included in the filter array illustrated in FIG. 2A.
Figure 2D:
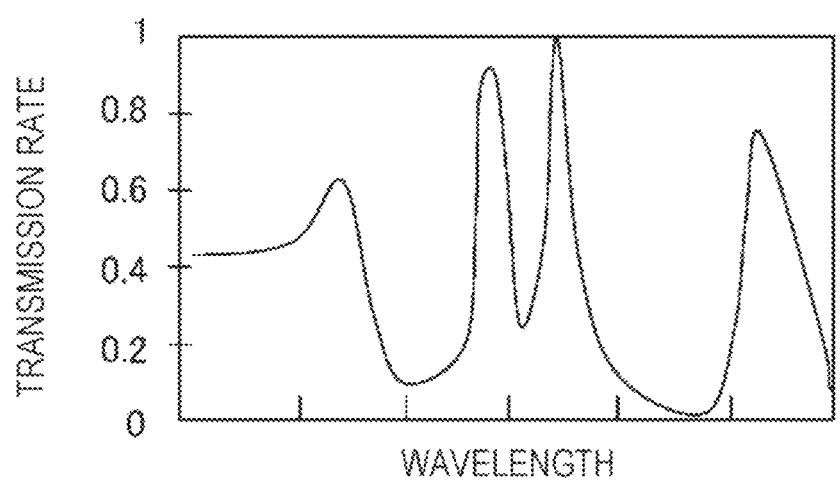
FIG. 2D is a graph illustrating an example of a spectral transmission rate of an area A2 included in the filter array illustrated in FIG. 2A.

FIG. 2C and FIG. 2D illustrate respective examples of spectral transmission rate of area A1 and area A2 included in the filter array 110 illustrated in FIG. 2A. The spectral transmission rate of the area A1 and the spectral transmission rate of the area A2 are different from each other. In this manner, the spectral transmission rate of the filter array 110 varies with the area. However, the spectral transmission rates of all areas are not necessarily different from each other. In the filter array 110, the spectral transmission rates of at least part of the areas are different from each other. The filter array 110 includes two or more filters having different spectral transmission rates from each other. In an example, the number of patterns of spectral transmission rate of the areas included in the filter array 110 may be equal to or greater than the number N of wavelength bands included in a target wavelength range. The filter array 110 may be designed so that more than half of the areas have different spectral transmission rates.

Figure 3A:
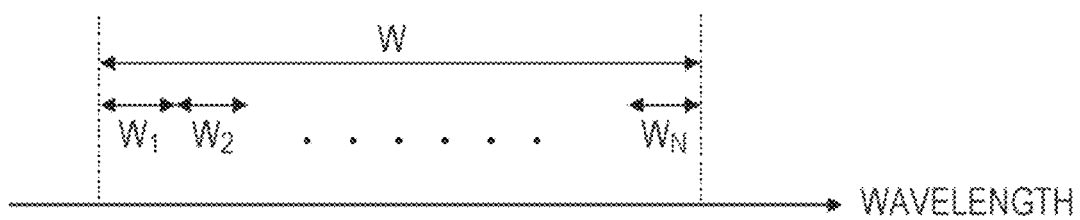
FIG. 3A is a graph illustrating an example of a relationship between a target wavelength range W and the wavelength bands $W_1, W_2, \ldots, W_N$ included in the target wavelength range W.
Figure 3B:
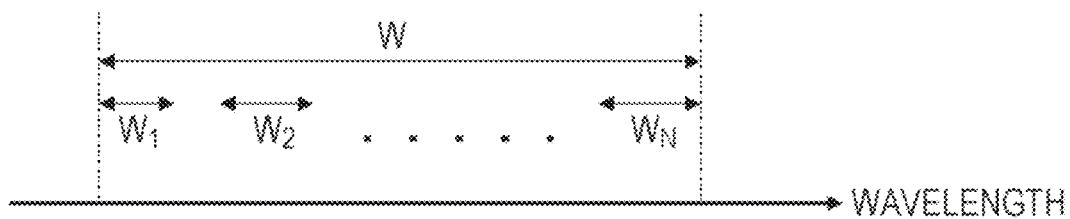
FIG. 3B is a graph illustrating another example of a relationship between a target wavelength range W and the wavelength bands $W_1, W_2, \ldots, W_N$ included in the target wavelength range W.

FIG. 3A and FIG. 3B are graphs for explaining a relationship between a target wavelength range W and wavelength bands $W_1$, $W_2$, . . . , $W_N$ included in the target wavelength range W. The target wavelength range W can be set to various ranges according to the application. The target wavelength range W may be, for example, a wavelength range of visible light from approximately 400 nm to approximately 700 nm, a wavelength range of near-infrared rays from approximately 700 nm to approximately 2500 nm, or a wavelength range of near-ultraviolet rays from approximately 10 nm to approximately 400 nm. Alternatively, the target wavelength range W may be a radio wave band such as mid-infrared, far-infrared, terahertz wave, or millimeter wave band. In this manner, the wavelength range to be used is not limited to a visible light range. In the present specification, not only visible light, but also invisible light such as near-ultraviolet rays, near-infrared rays and radio wave is also referred to as "light" for the sake of convenience.

In the example illustrated in FIG. 3A, the target wavelength range W is equally divided into N wavelength bands $W_1$, $W_2$, . . . , $W_N$, where N is any integer greater than or equal to 4. However, without being limited to this example, the wavelength bands included in the target wavelength range W may be set in any manner. For example, the bandwidth may not be uniform depending on the wavelength band. There may be a gap or overlap between adjacent wavelength bands. In the example illustrated in FIG. 3B, the bandwidth varies with the wavelength band, and there is a gap between any two adjacent wavelength bands. In this manner, the wavelength bands may be different from each other, and may be set arbitrarily.

Figure 4A:
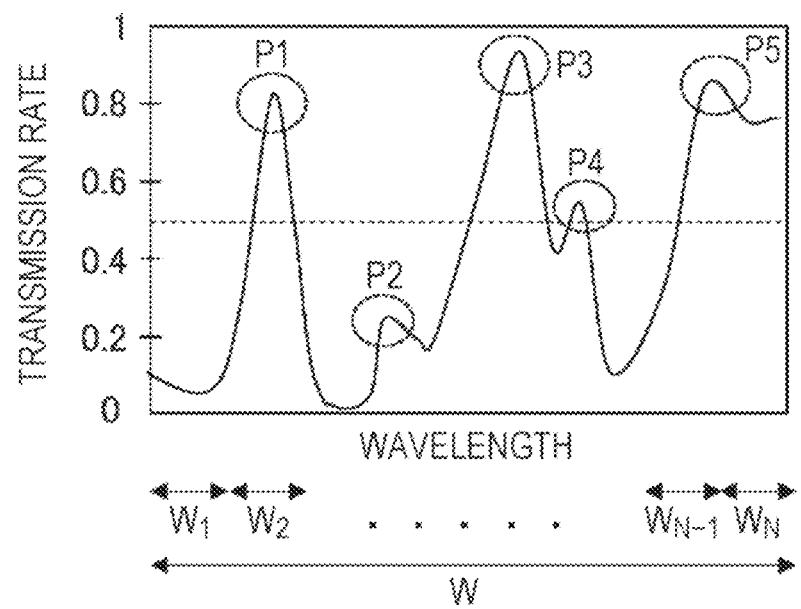
FIG. 4A is a graph for explaining the characteristics of spectral transmission rate in an area of a filter array.

FIG. 4A is a graph for explaining the characteristics of spectral transmission rate in an area of the filter array 110. In the example illustrated in FIG. 4A, the spectral transmission rate has local maxima P1 to P5, and local minima for the wavelength within the target wavelength range W. In the example illustrated in FIG. 4A, the graph is normalized so that the light transmission rate within the target wavelength range W has a maximum of 1 and a minimum of 0. In the example illustrated in FIG. 4A, the spectral transmission rate has local maxima in wavelength ranges such as the wavelength band $W_2$ and the wavelength band $W_{N-1}$. In this manner, the spectral transmission rate of the areas has local maxima in at least two wavelength ranges of the wavelength bands $W_1$ to $W_N$. In the example illustrated in FIG. 4A, the local maxima P1, P3, P4 and P5 are greater than or equal to 0.5.

As described above, the light transmission rate of each area varies with the wavelength. Therefore, the filter array 110 allows much of the component in a certain wavelength range of incident light to transmit, and does not allow much of the component in other wavelength ranges of incident light to transmit. For example, for the light in k wavelength bands among N wavelength bands, the transmission rate may be higher than 0.5, and for the remaining N–k wavelength bands, the transmission rate may be less than 0.5, where k is an integer that satisfies 2≤k<N. If the incident light is white light including all the wavelength components of visible light, the filter array 110 modulates the incident light to light having discrete wavelength intensity peaks for each band, and outputs light with these multiple wavelengths in a superimposed manner.

Figure 4B:
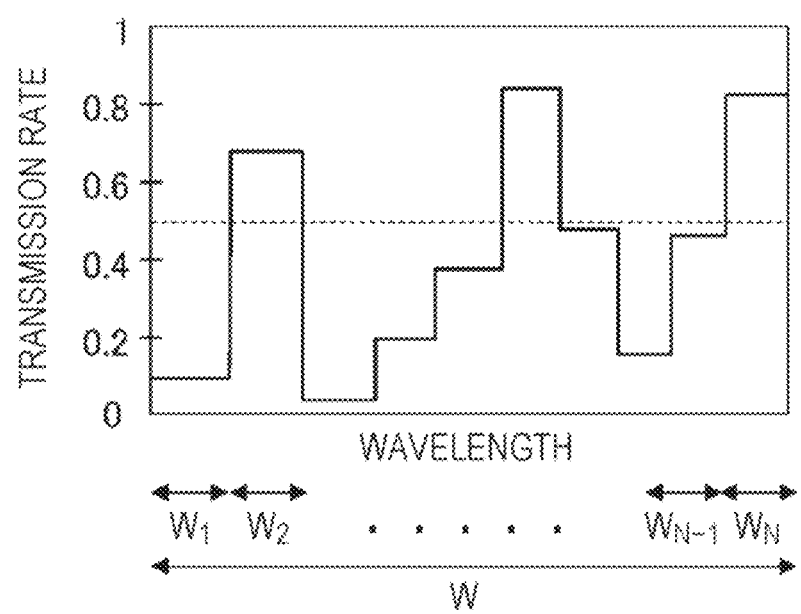
FIG. 4B is a graph showing a result obtained by averaging the spectral transmission rate illustrated in FIG. 4A for each of the wavelength bands $W_1, W_2, \ldots, W_N$.

As an example, FIG. 4B is a graph showing a result obtained by averaging the spectral transmission rate illustrated in FIG. 4A for each of the wavelength bands $W_1$, $W_2$, ..., $W_N$. The averaged transmission rate is obtained by integrating the spectral transmission rate T(λ) over each wavelength band and dividing the integral value by the bandwidth of the wavelength band. In the present specification, the value of transmission rate averaged over each wavelength band in this manner is defined as the transmission rate in the wavelength band. In this example, the transmission rate is significantly high in three wavelength ranges in which the local maxima P1, P3 and P5 are attained. Particularly, the transmission rate exceeds 0.8 in two wavelength ranges in which the local maxima P3 and P5 are attained.

The examples illustrated in FIG. 2A to FIG. 2D assume a transmission rate distribution of gray scale in which the transmission rate of each area takes an arbitrary value greater than or equal to 0 and less than or equal to 1. However, a transmission rate distribution of gray scale is not necessarily assumed. For example, a transmission rate distribution of binary scale may be adopted in which the transmission rate of each area takes one of approximately 0 or approximately 1. In a transmission rate distribution of binary scale, each area allows transmission of most of the light in at least two of the wavelength ranges included in the target wavelength range, but does not allow transmission of most of the light in the remaining wavelength ranges. Here, the "most" generally indicates higher than or equal to 80%.

Part of all the cells, for example, half of the cells may be replaced by transparent areas. Such transparent areas allow transmission of the light in all the wavelength bands from $W_1$ to $W_N$ included in the target wavelength range W with comparable high transmission rates, for example, with a transmission rate higher than or equal to 80%. In such a configuration, the transparent areas may be disposed in a checkerboard pattern, for example. In other words, in two arrangement directions of the areas in the filter array 110, an area in which the light transmission rate varies with wavelength and a transparent area may be arranged alternately.

Such data showing a spatial distribution of spectral transmission rate of the filter array 110 is obtained in advance based on design data or actual measurement calibration, and stored in a storage medium included in the signal processing device 200. The data is utilized in the later-described calculation processing.

The filter array 110 can be constructed using a microstructure including, for example, a multilayer film, an organic material, a diffraction grating structure, or metal. When a multilayer film is used, a multilayer film including, for example, a dielectric multilayer film or a metal layer may be used. In this case, each multilayer film is formed so that at least one of the thickness, material, or stacking order of the multilayer film is different for each filter. Thus, spectrum characteristics which vary with the filter can be implemented. Sharp rise and fall in spectral transmission rate can be implemented using a multilayer film. A configuration using an organic material can be implemented by differentiating the pigment or dye to be contained or stacking materials of different types filter by filter. A configuration using a diffraction grating structure can be implemented by providing a diffraction structure having a diffraction pitch or a depth which varies with the filter. When a microstructure containing metal is used, the microstructure can be produced utilizing a spectrum generated by the plasmon effect.

Next, an example of signal processing performed by the signal processing device 200 will be described. The signal processing device 200 reconstructs the multiwavelength hyperspectral image 220 based on the compressed image 120 output from the image sensor 160, and the spatial distribution characteristics of transmission rate for each wavelength of the filter array 110. Here, multiwavelength means wavelength ranges greater in number than the wavelength ranges of three colors of RGB obtained by a normal color camera, for example. The number of wavelength ranges may be, for example, a number in a range from 4 to approximately 100. The number of wavelength ranges is called the band number. The band number may exceed 100 depending on the application.

The data desired to be obtained is the data of the hyperspectral image 220, and let f be the data. Let N be the band number, then f is the data obtained by integrating image data $f_1, f_2, \ldots, f_N$, of the bands. As illustrated in FIG. 1A, x direction is the horizontal direction of the images, and y direction is the vertical direction of the images. Let n be the number of pixels in the image data to be obtained in the x direction, and m be the number of pixels in the y direction, then each of the image data $f_1, f_2, \ldots, f_N$ is two-dimensional data of n×m pixels. Therefore, the data f is three-dimensional data with the number of elements of n×m×N. The three-dimensional data is referred to as "hyperspectral image data" or "hyperspectral data cube". In contrast, the number of elements in data g of the compressed image 120 obtained through encoding and multiplexing by the filter array 110 is n×m. The data g can be represented by the following Equation (1).

$$g = Hf = H \begin{bmatrix} f_1 \\ f_2 \\ \vdots \\ f_N \end{bmatrix} \quad (1)$$

Each of $f_1, f_2, \ldots, f_N$ is data having n×m elements. Therefore, the vector on the right-hand side is one-dimensional vector with n×m×N rows and one column in a strict sense. The vector g is converted and expressed into one-dimensional vector with n×m rows and one column, and is calculated. Matrix H represents conversion of encoding and intensity-modulating the components $f_1, f_2, \ldots, f_N$ of the vector f with encoding information (hereinafter also referred to as "mask information") which varies with the wavelength band, and adding those components. Therefore, H is a matrix with n×m rows and n×m×N columns.

When the vector g and the matrix H are given, f seems to be calculable by solving the reverse problem of Equation (1). However, since the number n×m×N of elements of the data f to be determined is greater than the number n×m of elements of acquired data g, this problem is an ill-posed problem, and cannot be solved as it is. Thus, the signal processing device 200 utilizes the redundancy of the images included in the data f to determine a solution using a technique of compressive sensing. Specifically, the data f to be determined is estimated by solving the following Equation (2).

$$f' = \arg\min_{f}\{\|g - Hf\|_{l_2} + \tau\Phi(f)\} \quad (2)$$

Here, f' represents the estimated data f. The first term in the parenthesis of the above expression represents the amount of error between estimated result Hf and acquired data g, so-called the residual term. Although the sum of squares is the residual term here, the absolute value or the square root of the sum of squares may be the residual term. The second term in the parenthesis is a regularization term or a stabilization term. Equation (2) means determination of f that minimizes the sum of the first term and the second term. The signal processing device 200 can calculate the final solution f' by converging the solution by recursive iterative computation.

The first term in the parenthesis of Equation (2) means computation to determine the sum of square of the difference between acquired data g and Hf which is conversion of f in an estimation process by the matrix H. The second term φ(f) is a restriction condition in regularization of f, and is a function on which sparse information of estimated data is reflected. This function provides the effect of smoothing or stabilizing the estimated data. The regularization term can be expressed, for example, by discrete cosine transform (DCT), wavelet transform, Fourier transform, or total variation (TV) of f. For example, when total variation is used, stable estimated data with reduced effect of noise of observation data g can be obtained. The sparse property of the object 70 in the space of respective regularization terms varies with the texture of the object 70. A regularization term may be selected so that the texture of the object 70 becomes sparse in the space of the regularization term. Alternatively, regularization terms may be included in the computation. τ is a weight coefficient. Higher the weight coefficient τ, greater the amount of reduction of redundant data, thus the ratio of compression increases. Lower the weight coefficient τ, weaker the convergence to a solution. The weight coefficient τ is set to an appropriate value which allows f to converge to some extent and avoids excessive compression.

In the configuration of FIG. 1B and FIG. 1C, an image encoded by the filter array 110 is acquired on the imaging surface of the image sensor 160 in a blurred state. Thus, the hyperspectral image 220 can be reconstructed by preparing blur information in advance and reflecting the blur information on the above-mentioned matrix H. Here, the blur information is represented by a point spread function (PSF). PSF is a function that regulates the degree of expansion of a point image to peripheral pixels. For example, when a point image corresponding to one pixel on an image spreads to the area of k×k pixels in the periphery of the pixel due to blur, PSF can be prescribed as a coefficient group, that is, as a matrix showing the effect of pixels in the area on luminance. The hyperspectral image 220 can be reconstructed by reflecting, on the matrix H, the effect on blur due to an encoding pattern by the PSF. Although the position at which the filter array 110 is disposed is arbitrary, a position may be selected which prevents an encoding pattern of the filter array 110 from excessively diffusing and disappearing.

The above processing makes it possible to construct the hyperspectral image 220 from the compressed image 120 obtained by the image sensor 160. In the above example, the signal processing device 200 generates the hyperspectral image 220 by applying a compressive sensing algorithm to the entire compressed image 120. In this case, when the resolution of the compressed image 120 is high, the amount of calculation and time to generate the hyperspectral image 220 increases.

Thus, in the embodiment of the present disclosure, a method is used to extract only necessary areas from the obtained compressed image 120 and restore an image. Hereinafter an overview of the embodiment of the present disclosure will be described.

A signal processing method according to the exemplary embodiment of the present disclosure is performed by a computer. The signal processing method includes: obtaining first compressed image data including hyperspectral information and indicating a two-dimensional image in which the hyperspectral information is compressed, the hyperspectral information being luminance information on each of at least four wavelength bands included in a target wavelength range; extracting partial image data from the first compressed image data; and generating first two-dimensional image data corresponding to a first wavelength band and second two-dimensional image data corresponding to a second wavelength band from the partial image data.

Here, the "hyperspectral information" means luminance information on each of four or more wavelength bands included in a predetermined target wavelength range. As described above, the compressed image data can be obtained by imaging using a filter array including several types of optical filters having transmission spectra different from each other. Information on, for example, four or more wavelength bands can be superimposed on the data of each pixel in the compressed image data. Information on 10 or more, or 100 or more wavelength bands may be superimposed on the data of each pixel depending on the application. In addition, the compressed image data may include information on wavelength bands each spatially encoded. Partial image data can be extracted based on, for example, image recognition or instructions from a user. By the method described above, pieces of two-dimensional image data related to wavelength bands are generated from the partial image data extracted from the compressed image data. Thus, the amount of calculation and time can be reduced, as compared to when pieces of two-dimensional image data related to wavelength bands are generated from the entire compressed image. Note that two-dimensional image data does not need to be generated for all the wavelength bands included in a target wavelength range, and may be generated for only part of the wavelength bands. The two-dimensional image data can be generated by applying, for example, the compressive sensing algorithm as described above to partial image data.

The first compressed image data may include data of pixels, data of each of the pixels may include first information and second information which are superimposed on each other, and each of the first information and the second information may correspond to one of the at least four wavelength bands.

The first compressed image data may include first information that is spatially encoded and second information that is spatially encoded, and each of the first information and the second information may correspond to one of the at least four wavelength bands.

The method may further include determining whether the partial image data is appropriate for generating the first two-dimensional image data and the second two-dimensional image data from the partial image data. In that case, different processing is performed according to a result of the determination.

Specifically, the method may further include: upon determination that the partial image data is appropriate for generating the first two-dimensional image data and the second two-dimensional image data from the partial image data, performing a first process; and upon determination that the partial image data is inappropriate for generating the first two-dimensional image data and the second two-dimensional image data from the partial image data, performing a second process different from the first process.

Determination as to whether the partial image data is appropriate for generating the first two-dimensional image data and the second two-dimensional image data from the partial image data may be made based on the number of pixels in the partial image data. For example, only when the number of pixels in the partial image data exceeds a predetermined threshold, the pieces of two-dimensional image data may be generated.

The second process is may be to increase the number of pixels in the partial image data.

Specifically, the method may further include, upon determination that the partial image data is inappropriate for generating the first two-dimensional image data and the second two-dimensional image data from the partial image data, increasing the number of pixels in the partial image data extracted from the compressed image data. In that case, the pieces of two-dimensional image data may be generated from the partial image data with the increased number of pixels.

The first compressed image data may be generated by an imaging device including: a filter array including several types of optical filters having different spectral transmission rates from each other; and an image sensor that obtains an image formed by light which passes through the filter array.

The second process may be to generate second compressed image data by causing the imaging device to magnify and image an area corresponding to the partial image data, and the first two-dimensional image data and the second two-dimensional image data may be generated based on the second compressed image data.

Specifically, the method may further include, upon determination that the partial image data is inappropriate for generating the first two-dimensional image data and the second two-dimensional image data from the partial image data, generating new compressed image data by causing the imaging device to magnify and image an area corresponding to the partial image data. The first two-dimensional image data and the second two-dimensional image data may be generated based on the new compressed image data.

The method may further include obtaining mask data on which a spatial distribution of the spectral transmission rates of the filter array is reflected. The first two-dimensional image data and the second two-dimensional image data may be generated based on part of the mask data, corresponding to the partial image data, and the partial image data.

The second process may be to cause a display device to display an error.

Specifically, the method may further include, upon determination that the partial image data is inappropriate for generating the first two-dimensional image data and the second two-dimensional image data from the partial image data, causing a display device to display an error.

The method may further include causing a display device to display a graphical user interface (GUI) that allows a user to specify an area in the two-dimensional image, to be extracted as the partial image data.

The method may further include detecting an edge of the two-dimensional image The partial image data may be extracted based on the edge detected.

The method may further include extracting luminance information on a specific wavelength component from the first compressed image data. The partial image data may be extracted based on the luminance information.

The method may further include causing a display device to display a graphical user interface that allows a user to input threshold data for determining whether the partial image data is appropriate for generating the first two-dimensional image data and the second two-dimensional image data from the partial image data.

In the method, the threshold data may include a parameter related to the number of pixels or a luminance error.

A signal processing device according to another embodiment of the present disclosure includes: a processor; and a memory that stores a computer program to be executed by the processor. The computer program causes the processor to execute a process comprising: obtaining compressed image data including hyperspectral information and indicating a two-dimensional image in which the hyperspectral information is compressed, the hyperspectral information being luminance information on each of at least four wavelength bands included in a target wavelength range; extracting partial image data from the compressed image data; and generating first two-dimensional image data corresponding to a first wavelength band and second two-dimensional image data corresponding to a second wavelength band from the partial image data.

An imaging system according to another embodiment of the present disclosure includes: the signal processing device; and an imaging device that generates the compressed image data.

A computer program according to another embodiment of the present disclosure causes a computer to execute a process comprising: obtaining compressed image data including hyperspectral information and indicating a two-dimensional image in which the hyperspectral information is compressed, the hyperspectral information being luminance information on each of at least four wavelength bands included in a target wavelength range; extracting partial image data from the compressed image data; and generating first two-dimensional image data corresponding to a first wavelength band and second two-dimensional image data corresponding to a second wavelength band from the partial image data.

A non-transitory computer-readable recording medium storing a computer program according to another embodiment of the present disclosure, upon being executed, causes a computer to execute a process comprising: obtaining compressed image data including hyperspectral information and indicating a two-dimensional image in which the hyperspectral information is compressed, the hyperspectral information being luminance information on each of at least four wavelength bands included in a target wavelength range; extracting partial image data from the compressed image data; and generating first two-dimensional image data corresponding to a first wavelength band and second two-dimensional image data corresponding to a second wavelength band from the partial image data.

Hereinafter, a more specific embodiment of the present disclosure will be described. However, a detailed description more than necessary may be omitted. For example, a detailed description of well-known matters and a redundant description of substantially the same configuration may be omitted. This is to prevent the following description from being unnecessarily redundant and to facilitate the understanding of those skilled in the art. It should be noted that the inventors provide the attached drawings and the following description for those skilled in the art to sufficiently understand the present disclosure, and it is not intended to limit the subject matter described in the claims. In the following description, the same or similar components are labeled with the same reference symbol. In the following description, xyz coordinates shown in the drawings are used. In the present specification, data representing an image may be simply referred to as an "image".

Embodiment

Figure 5:
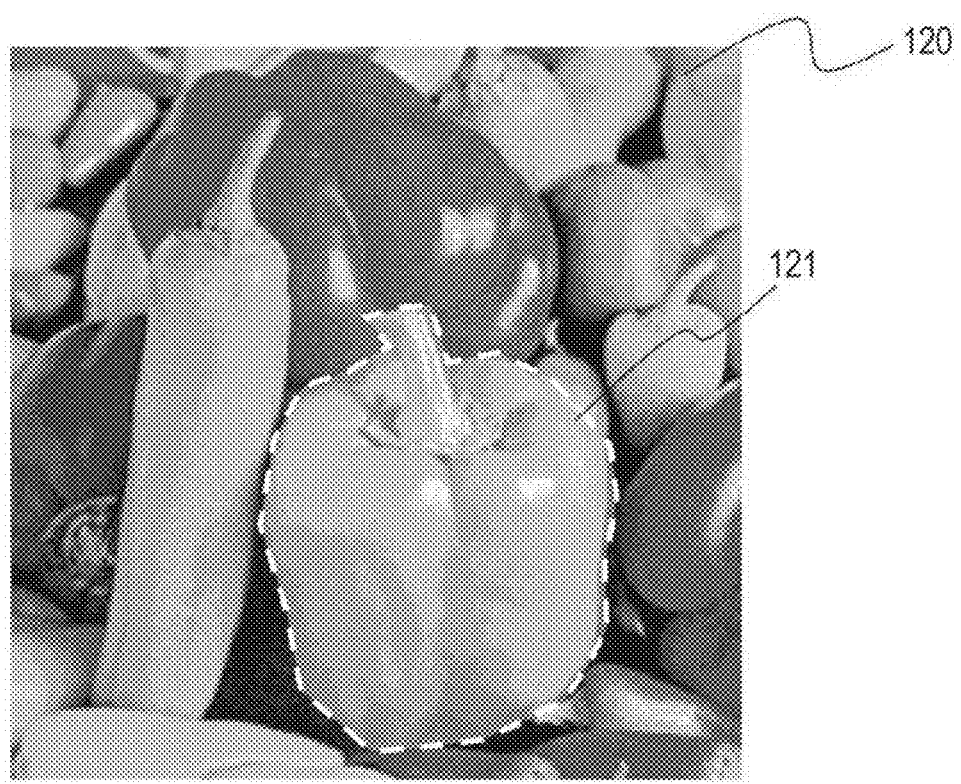
FIG. 5 is a picture illustrating an example of a compressed image captured by a hyperspectral camera.

First, referring to FIG. 5, a situation in which a hyperspectral camera is used will be described, the hyperspectral camera being an example of an imaging system according to an embodiment of the present disclosure. FIG. 5 is a picture illustrating an example of the compressed image 120 captured by a hyperspectral camera. In this example, vegetables are captured as subjects. The signal processing device 200 obtains the compressed image 120 from the image sensor 160, and generates the hyperspectral image 220 by performing the above-described calculation processing on the compressed image 120.

Here, a case will be discussed where a hyperspectral image is needed only for a specific target in an area 121 in the compressed image 120 including objects. Such necessity may occur in many situations, for example, selection of fruits and vegetables, inspection of industrial products, and inspection of the appearance of buildings. In these situations, the hyperspectral camera according to the embodiment extracts a partial area 121 from the compressed image 120, and performs calculation processing based on the compressive sensing only on the area 121 to generate a hyperspectral image. The amount of necessary calculation can be reduced by this processing, as compared to when the calculation processing is performed on the entire area of the compressed image 120 to generate a hyperspectral image. Consequently, improvement of calculation speed, and reduction in the cost of necessary calculation processing units (for example, a memory and a CPU) are made possible.

Meanwhile, it has been found by the inventors that the smaller the calculation target area, the higher the occurrence of error in color of a generated hyperspectral image. This problem will be described with reference to FIG. 6.

Figure 6:
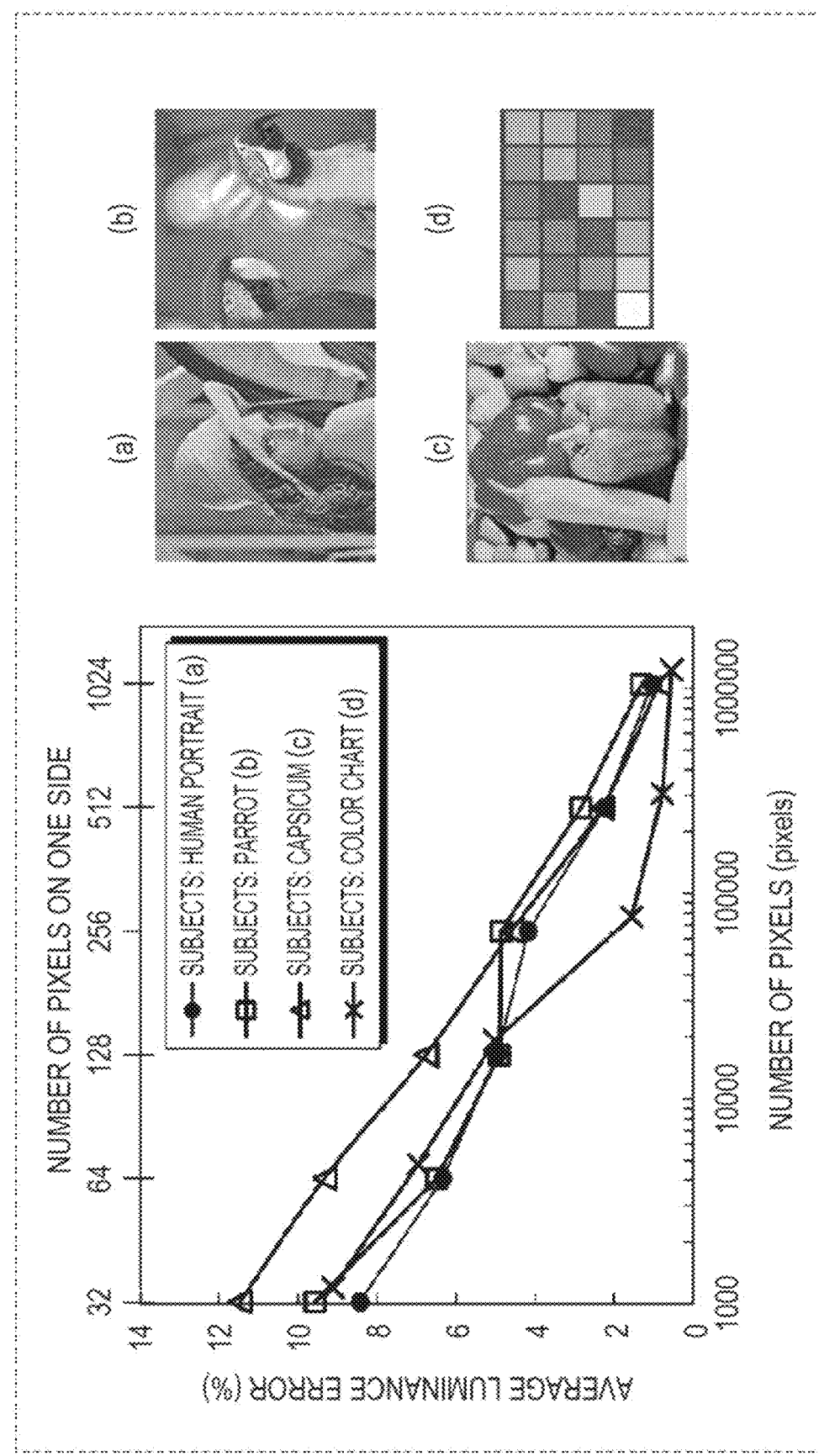
FIG. 6 is a graph showing an example of a relationship between error in hyperspectral image generated by calculation based on compressive sensing and the number of pixels.

FIG. 6 is a graph showing an example of a relationship between error in hyperspectral image generated by calculation based on the above-described compressive sensing and the number of pixels. The graph illustrated in FIG. 6 shows the dependence of average luminance error on the number of pixels for each of four images shown in FIG. 6(a) to FIG. 6(d), the average luminance error being between generated hyperspectral image and actual image. Here, the average luminance error is the percentage of the value obtained by dividing an average value by a maximum luminance value, the average value being obtained by averaging the absolute value of the difference between the luminance value of each pixel in a generated hyperspectral image and the luminance value of each pixel corresponding to an actual image for all the pixels and all the wavelength bands. As shown in FIG. 6, it has been found that with a decrease in the number of pixels in the compressed image, a luminance error which occurs in the generated hyperspectral image increases. In the example of FIG. 6, with a decrease in the number of pixels, the luminance error can increase to exceed 5%, for example. The luminance error of 5% means that when the luminance value of each pixel in an image is represented by, for example, 10 bits (in other words, 1024 gradations), the luminance value of a pixel in a certain wavelength band is calculated off from the true value by approximately 50. Like this, when the number of pixels in a compressed image is small, a false color tends to occur in a generated hyperspectral image. For example, the following behavior may occur: in a certain wavelength band, a signal with a non-negligible large size occurs in a pixel with an originally very low signal, or conversely, a signal is not detected in a pixel with an originally relatively large signal. Such a behavior may lead to a wrong conclusion, for example, in an application such as foreign matter inspection and appearance inspection.

Thus, in an imaging system in the embodiment, in a process of extracting a specific area from a compressed image and generating a hyperspectral image, it is determined whether the extracted area has a sufficient size to obtain a hyperspectral image with a low luminance error, and when the extracted area does not have a sufficient size, an operation is performed, for instance, the extracted area is expanded or an error is output. Introducing such an operation makes it possible to prevent the occurrence of false color due to insufficient resolution or number of pixels in a partial area extracted from a compressed image generated by imaging, thus, it is possible to avoid generation of a hyperspectral image significantly different from the actual image.

Hereinafter, the configuration and the operation of the imaging system of the embodiment will be described more specifically.

Figure 7:
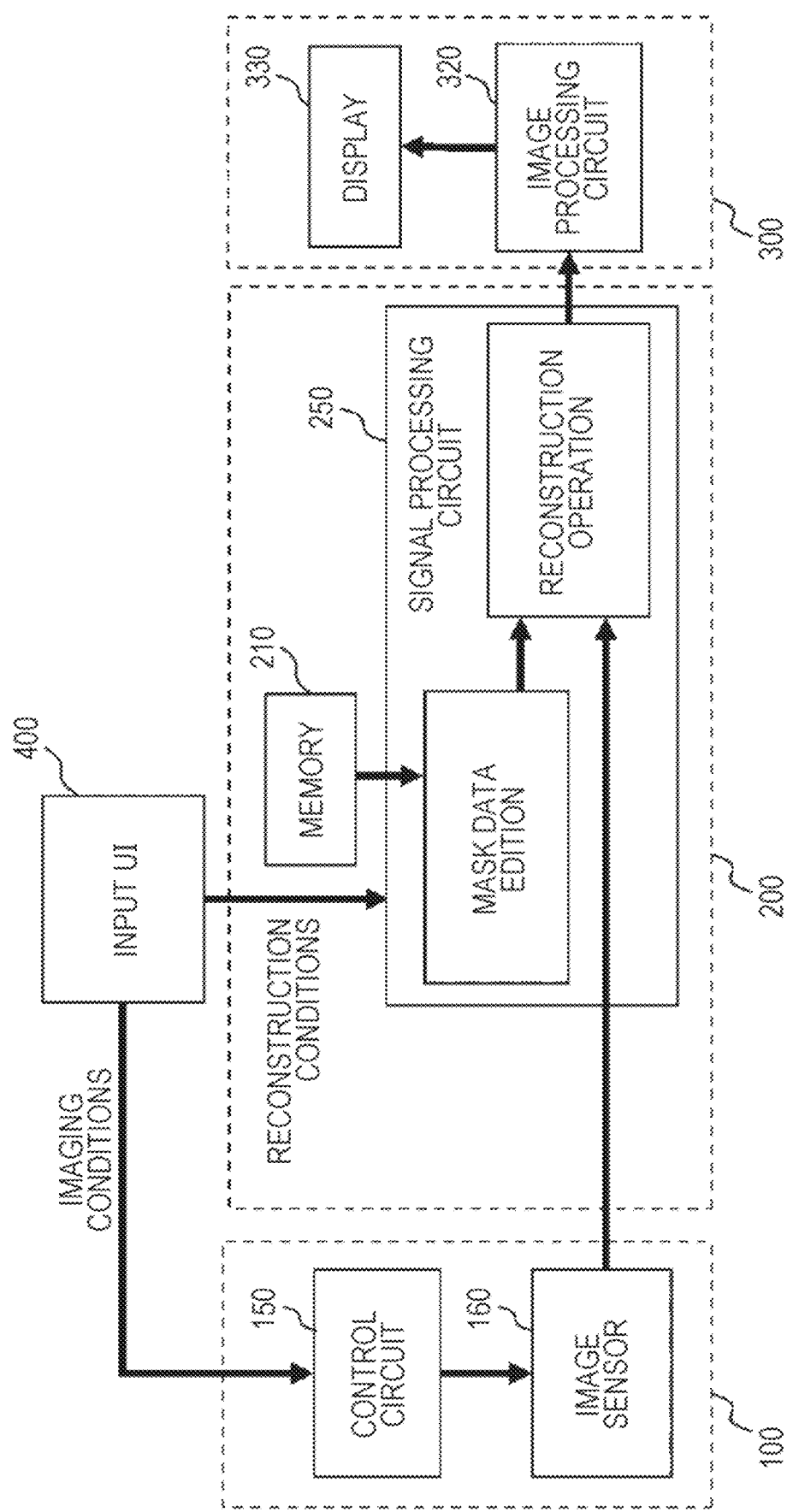
FIG. 7 is a diagram illustrating a configuration of an imaging system in an exemplary embodiment of the present disclosure.

FIG. 7 is a diagram illustrating the configuration of the imaging system of the embodiment. The system includes an imaging device 100, a signal processing device 200, a display device 300, and an input user interface (I) 400.

The imaging device 100 includes an image sensor 160, and a control circuit 150 that controls the image sensor 160. Although not shown in FIG. 7, the imaging device 100 also includes a filter array 110 and at least one optical system 140 as illustrated in FIGS. 1A to 1D. The arrangement of the filter array 110 and the optical system 140 may be any arrangement of FIG. 1A to FIG. 1D. The filter array 110 includes several types of optical filters having different spectral transmission rates from each other. The image sensor 160 obtains a monochrome image based on light with an intensity modulated by the filter array 110 for each area. Information on wavelength bands in a target wavelength area W is superimposed on the data of each pixel in the monochrome image. Thus, it can be stated that the monochrome image is such that the hyperspectral information in the target wavelength range W is compressed in a two-dimensional image. Such a monochrome image is an example of a "compressed image". In the present specification, data representing a compressed image is referred to as "compressed image data".

In the above-described example of a compressed image, information on wavelength bands is superimposed on the data of each pixel, and the luminance of each of the wavelength bands is spatially encoded, thus, it can be stated that the hyperspectral information is compressed in the wavelength direction and the spatial direction. The compressed image is not limited to such an example, and may be, for example, the two-dimensional image as disclosed in International Publication No. 2016/012980, in which information on the wavelength bands is encoded only in the spatial direction.

The signal processing device 200 includes a signal processing circuit 250, and a memory 210 such as a RAM and a ROM. The circuit 250 performs a reconstruction process based on the compressed image data output from the image sensor 160. The reconstruction process is basically the same as the process performed by the signal processing device 200, illustrated in FIG. 1A to FIG. 1D; however, in this embodiment, the reconstruction process is performed in accordance with the reconstruction conditions input from an input UI 400. The signal processing circuit 250 performs calculation based on a compressive sensing algorithm only on a specified partial area in the compressed image, thereby generating a hyperspectral image of the partial area. Consequently, the amount of calculation and time can be reduced.

The data of a hyperspectral image includes information on totally three dimensions: two dimensions of space and one dimension of wavelength. In the present specification, data representing a hyperspectral image is referred to as "three-dimensional hyperspectral data".

The display device 300 includes an image processing circuit 320, and a display 330. The image processing circuit 320 performs necessary processing on an image restored by the signal processing circuit 250, then causes the display 330 to display the image. The display 330 may be any display such as a liquid crystal or organic LED display.

The input UI 400 includes hardware and software to set various conditions such as an imaging condition and a reconstruction condition. The imaging condition may include conditions such as a resolution, a gain, and an exposure time. The reconstruction condition may include conditions such as information indicating whether a specific area is extracted from a compressed image, information on specification of a partial area to be extracted, and the number of iteration. An imaging condition inputted is sent to the control circuit 150 of the imaging device 100. The control circuit 150 causes the image sensor 160 to perform imaging in accordance with the imaging condition. Thus, the image sensor 160 generates a compressed image in which information on wavelength bands in the target wavelength range W is superimposed. A reconstruction condition inputted is sent to the signal processing circuit 250 to be recorded. The signal processing circuit 250 performs a reconstruction process in accordance with the imaging condition which has been set, and generates three-dimensional hyperspectral data of a specified partial area. The image processing circuit 320 causes the display 330 to display an image in the wavelength bands, represented by the three-dimensional hyperspectral data.

At the time of reconstruction, the signal processing circuit 250 edits and uses the mask data pre-recorded in the memory 210 as necessary in accordance with the reconstruction condition input by the input UI 400. The mask data is data on which the spatial distribution of the spectral transmission rate of the filter array 110 is reflected, and corresponds to the matrix H in the above Equation (2). The signal processing circuit 250 uses partial mask data which is extracted from the mask data and corresponds to a specified partial area, and generates a hyperspectral image of the partial area. The generated hyperspectral image is processed by the image processing circuit 320 as necessary. The image processing circuit 320 performs processes such as determination of an arrangement in the screen, association with band information, and coloring corresponding to wavelength, then causes the display 330 to display a hyperspectral image.

Figure 8:
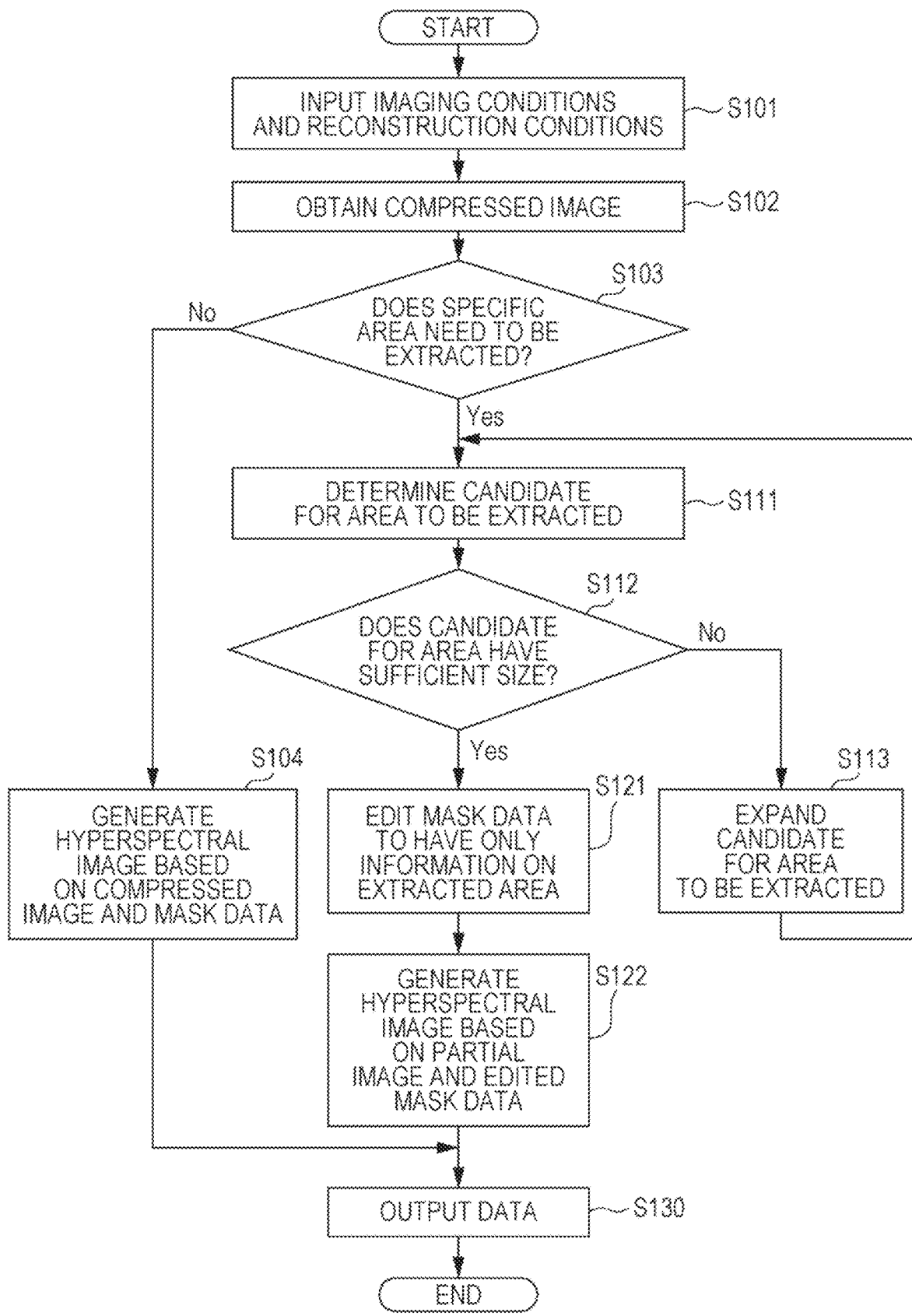
FIG. 8 is a flowchart showing the operation of the imaging system.

FIG. 8 is a flowchart showing the operation of the system of the embodiment. In the embodiment, a user first inputs an imaging condition and a reconstruction condition through the input UI 400 (step S101). The data showing the inputted imaging condition is sent to the control circuit 150. The data showing the inputted reconstruction condition is sent to the signal processing circuit 250. Next, the imaging device 100 obtains a compressed image by imaging an object in accordance with the imaging condition (step S102).

When a compressed image is obtained, the signal processing circuit 250 determines whether a specific area needs to be extracted from the compressed image (step S103). Whether a specific area needs to be extracted can be determined based on, for example, the reconstruction condition inputted by a user. The signal processing circuit 250 may automatically determine the necessity of extraction of an area based on the content of the compressed image. For example, when a specific shape is detected in the compressed image, the region excluding the area may be extracted. For example, in the application to select fruits and vegetables on a rack, such extraction process corresponds to a process of removing a rack portion with many straight lines from the compressed image. The signal processing circuit 250 may limit the area by approximate color differentiation. For example, in inspection of the appearance of buildings, a process of removing the blue portion of the sky is possible.

When it is determined that no specific area needs to be extracted, the signal processing circuit 250 generates a hyperspectral image based on the compressed image and the mask data by the above-described method (step S104). The image processing circuit 320 causes the display 330 to display the generated hyperspectral image (step S130).

In step S103, when it is determined that a specific area needs to be extracted from the compressed image, the signal processing circuit 250 determines a candidate for the area to be extracted (step S111). The signal processing circuit 250 determines, for example, the area specified by a user as a candidate. Alternatively, the signal processing circuit 250 may determine a candidate for the area to be extracted from a compressed image or a semi-compressed image by a method such as edge detection or detection of luminance information on specific wavelength components. The semi-compressed image may be a color image generated by restoring, for example, the three primary colors R (red), G (green), B (blue) from the compressed image, or may be a monochrome image which is denoised by multiplying the compressed image by the reciprocal distribution of a transmission rate distribution indicated by the mask data of the entire wavelength bands.

The signal processing circuit 250 determines whether the candidate for the area to be extracted has a sufficient resolution for performing the reconstruction calculation, in other words, a sufficient volume of spatial information (step S112). Whether the candidate for the area to be extracted has a sufficient resolution for performing the reconstruction calculation is determined, for example, based on whether the number of pixels in the candidate for the area exceeds a predetermined threshold. The threshold may vary with a target of the reconstruction calculation. The imaging system may be configured to allow a user to set a threshold through the input UI 400. A user may input the number of pixels as a threshold; however, the configuration is not limited to thereto. For example, a user may input a luminance error as a threshold, and the imaging system may convert the inputted luminance error to the number of pixels based on the relationship illustrated in FIG. 6. When the volume of spatial information is insufficient, the signal processing circuit 250 expands the candidate for the area to be extracted (step S113). For example, the candidate for the area to be extracted may be expanded by adding all the pixels adjacent to the outermost periphery of the area determined in step S111 to the candidate for the area. Thus, the amount of spatial information is supplemented, and a new candidate for the area to be extracted is determined. In step S112, the process in steps S111 to S113 is repeated until it is decided that the determined candidate for the area has a sufficient size.

The above operation determines an extraction area having a sufficient resolution for performing reconstruction calculation, and extracts a partial image from the compressed image. The signal processing circuit 250 cuts out data corresponding to an extracted area from the mask data stored in the memory 210, thereby editing the data (step S121). Subsequently, the signal processing circuit 250 uses the partial image extracted from the compressed image and the mask data cut out to generate a hyperspectral image (step S122). The calculation to generate a hyperspectral image is the same as the calculation described with reference to Equations (1) and (2). The image processing circuit 320 causes the display 330 to display the generated hyperspectral image (step S130).

The above-described extraction and calculation processing may be performed for a single area or several areas in the compressed image. When the above processing is performed for several areas, the processing is performed for each of the areas separately.

Subsequently, referring to FIG. 9 and FIG. 10, an example of a graphical user interface (GUI) displayed by a program that executes the above information processing will be described. An image to implement the GUI is generated by the signal processing circuit 250 and the image processing circuit 320, and is displayed by the display 330.

Figure 9:
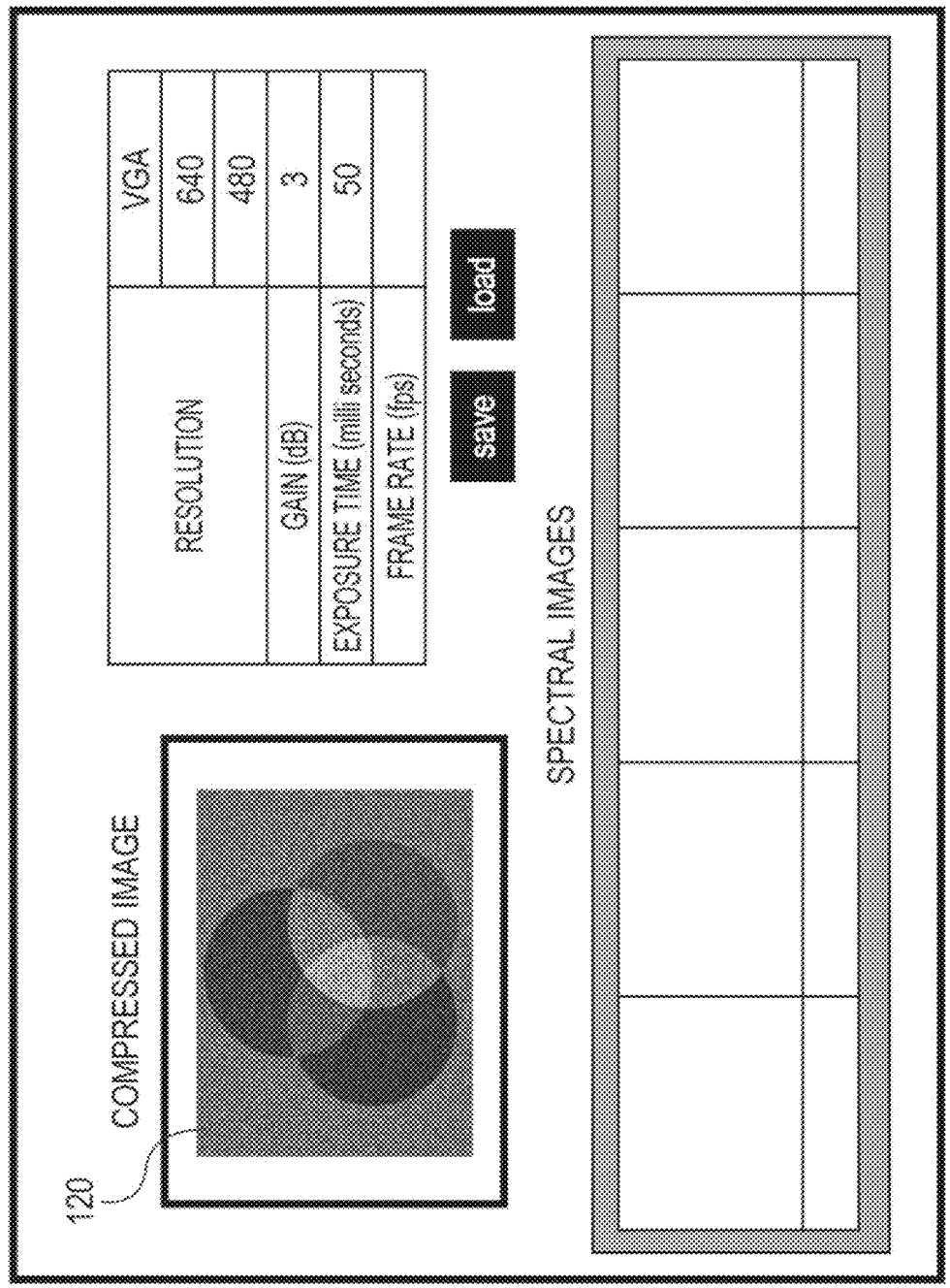
FIG. 9 is an image showing an example of a screen of GUI to input an imaging condition.

FIG. 9 shows an example of a screen of GUI to input an imaging condition. In this example, a user sets a resolution, a gain, an exposure time, and a frame rate before hyperspectral imaging is performed. The resolution represents the number of pixels along the length and width of an image displayed. The resolution may be specified, for example, by a user selecting a name such as VGA, HD, 4K from a pull-down menu, or directly inputting the number of pixels along the length and width. The gain is specified with a rational number greater than or equal to 0, and may be inputted by addition, subtraction, multiplication and division of rational numbers. For example, when 8/3 is input, the gain can be set to 2.6666 . . . dB. Both an exposure time and a frame rate are not necessarily input. A user may input at least one of an exposure time or a frame rate, and when inputs are incompatible, (for example, exposure time is 100 ms and frame rate is 30 fps), one of them may be preferentially selected. In addition to the input of the above-mentioned four conditions, a function of automatically adjusting the gain, the exposure time, and the frame rate may be provided. For example, the average luminance may be automatically adjusted to ½ a maximum luminance. As in the example illustrated in FIG. 9, the GUI to input an imaging condition may be provided with a function of saving and loading the imaging condition set. In addition, the GUI may be provided with a function of displaying the compressed image 120 in real time obtained in the imaging condition set. The compressed image itself is not necessarily displayed. Any image obtained in the imaging condition currently set may be displayed. For example, pixels to output only the values of red (R), green (G), blue (B) may be arranged, and an RGB image obtained using only the values of those pixels may be displayed. For example, reconstruction is performed with three bands by the later-described processing to composite unit bands, where a first band is from 400 nm to 500 nm, a second band is from 500 nm to 600 nm, and a third band is from 600 nm to 700 nm, and a result of the reconstruction may be displayed as an RGB image.

Figure 10:
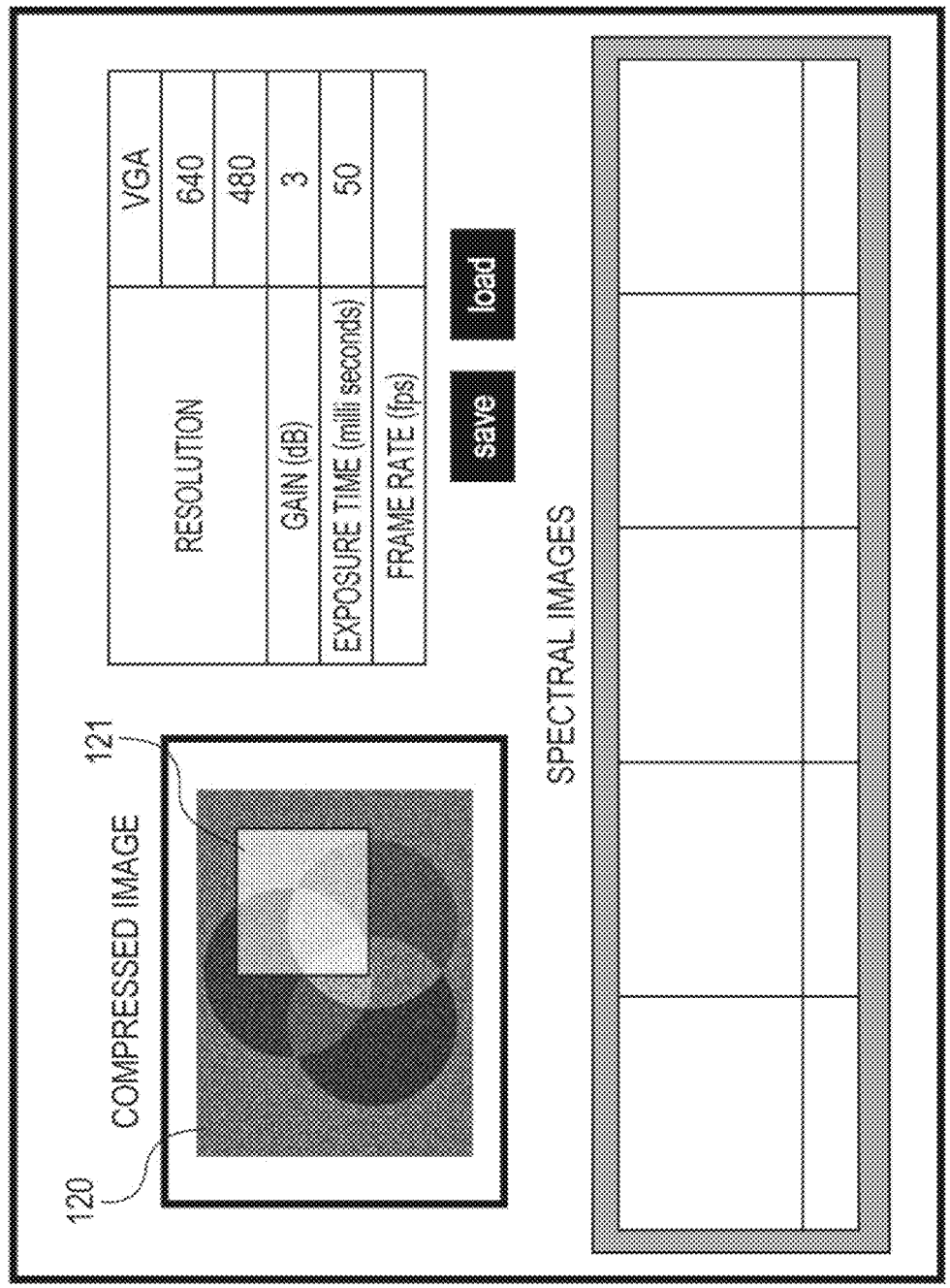
FIG. 10 is an image showing an example of a GUI to set an area to be extracted.

FIG. 10 is an image showing an example of a GUI that allows a user to manually set an area to be extracted. In the GUI, the area 121 to be extracted can be specified from the displayed compressed image 120 or semi-compressed image by a method such as drag & drop or coordinate input, for example. The calculation target area may be displayed on the GUI, for example, by a method of surrounding the area with a dotted line, or displaying a figure having a transmission rate higher than or equal to 1% in a superposed manner. The area specified by a user may be automatically corrected. For example, a handwritten circle may be automatically corrected to an exact circle or an ellipse. FIG. 10 shows an example in which a single area is specified as a calculation target; however, several areas may be specified as a calculation target. In this manner, the signal processing circuit 250 causes the display device 300 to display the GUI that allows a user to specify an image area to be extracted as a partial image.

After a candidate for the area to be extracted is determined by the method as shown in FIG. 10, the signal processing circuit 250 determines based on the number of pixels in the determined area whether the area includes a sufficient amount of spatial information for calculation processing. The minimum of the number of pixels necessary for calculation processing varies with an observation target or an acceptable luminance error. When deciding that the determined area does not include the number of pixels necessary for calculation processing, the signal processing circuit 250 expands the periphery of the candidate for the area to obtain the number of pixels necessary for calculation processing. For example, the area can be expanded by repeating a process of incorporating all the pixels adjacent to the periphery of the candidate for the area into the candidate for the area.

Figure 11A:
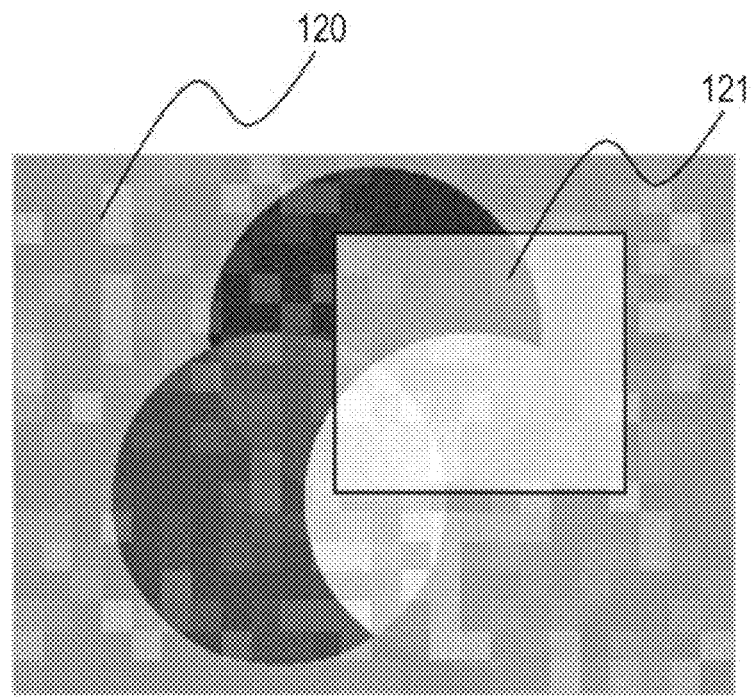
FIG. 11A is an image to explain an editing process for mask data.
Figure 11B:
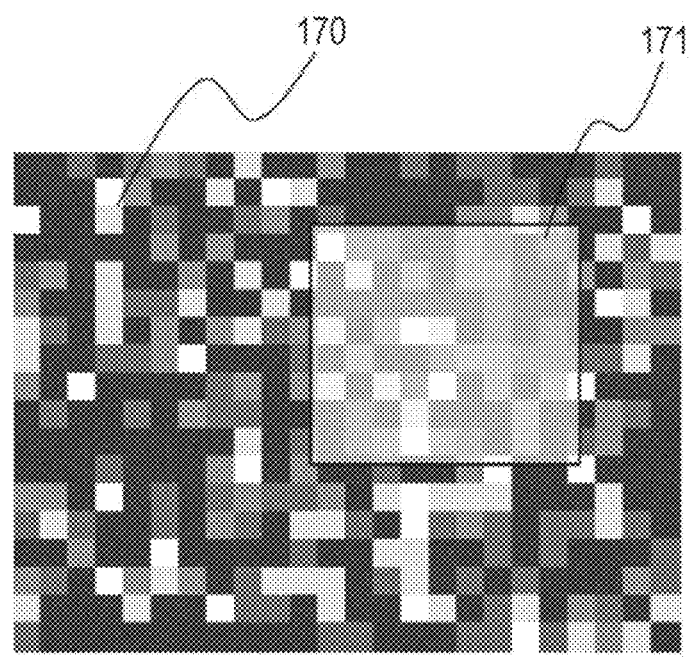
FIG. 11B is an image to explain an editing process for mask data.

FIG. 11A and FIG. 11B are each an image to explain an editing process for mask data in step S121 of FIG. 8. As illustrated in FIG. 11A, a case will be discussed where the area 121 included in the compressed image 120 is extracted to generate a hyperspectral image. Here, the compressed image 120 is assumed to be obtained by capturing, using a filter array having transmission rate information 170 as illustrated in FIG. 11B. Calculation to generate a hyperspectral image for the area 121 is performed using transmission rate information 171 which is part of the transmission rate information 170, corresponding to the area 121. In this manner, the edition of mask data in step S121 can include cutting out only part of the transmission rate information included in the mask data, and generating mask data used for calculation.

In this manner, in the embodiment, the signal processing circuit 250 extracts a partial image from a compressed image which is a two-dimensional monochrome image including hyperspectral information, and generates a hyperspectral image from the partial image using a compressive sensing algorithm. The signal processing circuit 250 determines based on the number of pixels in the partial image whether a hyperspectral image can be generated from the partial image. When determining that a hyperspectral image can be generated from the partial image, the signal processing circuit 250 generates a hyperspectral image based on the partial image. In contrast, when determining that a hyperspectral image cannot be generated from the partial image, the signal processing circuit 250 increases the number of pixels in the partial image extracted from the compressed image, and generates a hyperspectral image based on the partial image with the increased number of pixels.

The above processing makes it possible to reduce the amount of calculation required to generate a hyperspectral image, and to further prevent the occurrence of false color in the hyperspectral image.

Subsequently, a modification of the embodiment will be described.

Figure 12:
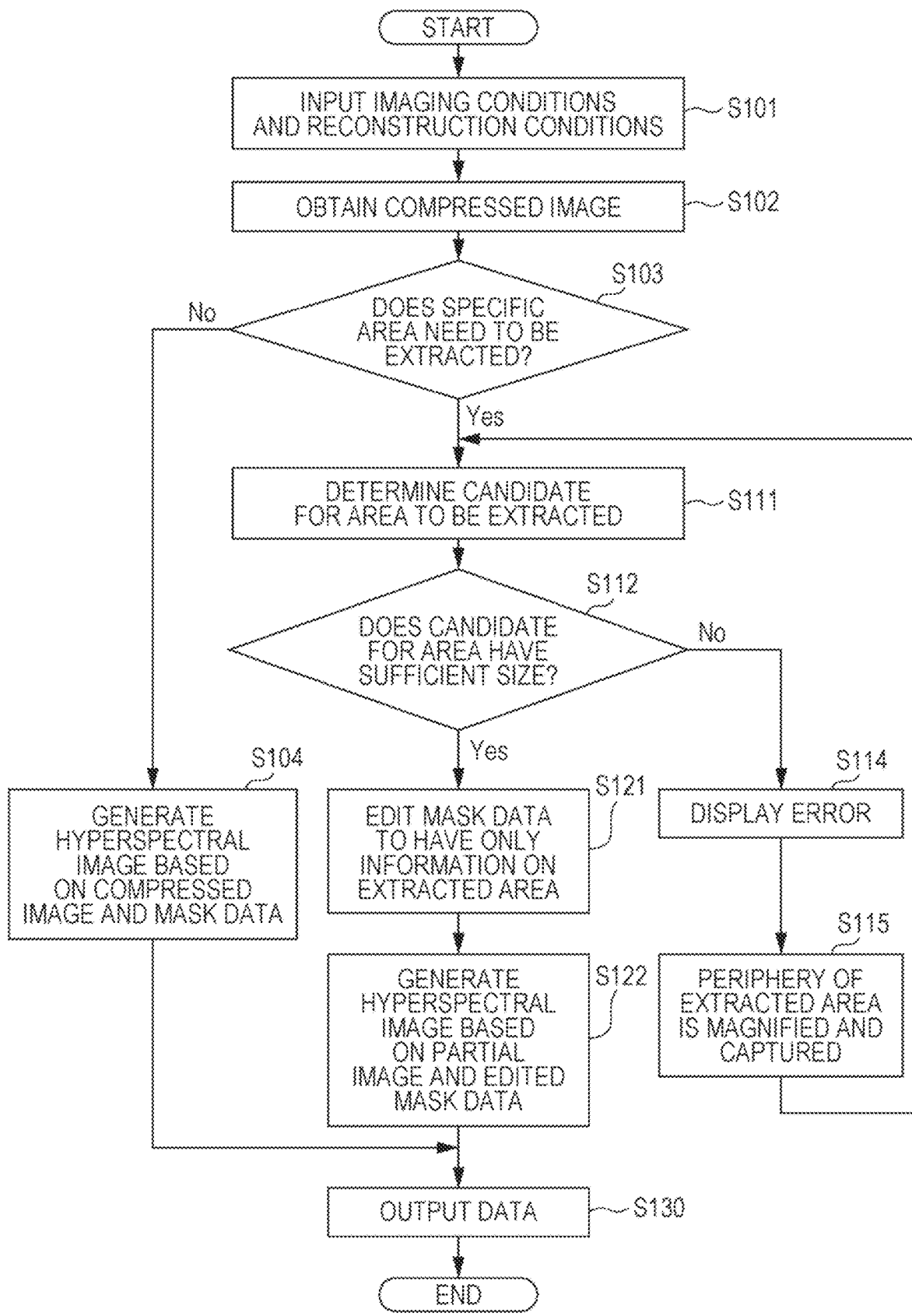
FIG. 12 is a flowchart showing the operation of an imaging system in the first modification.

FIG. 12 is a flowchart showing an example in which instead of step S113 in FIG. 8, the operation in steps S114 and S115 is performed. In this example, when it is determined in step S112 that the candidate for the area to be extracted is insufficient in size, the signal processing circuit 250 causes the display device 300 to display an error (step S114). The signal processing circuit 250 instructs the imaging device 100 to magnify and capture an image of the periphery of the extracted area (step S115). Upon receiving the instructions, the imaging device 100 generates a new compressed image with an object area more expanded than before. In subsequent step S111, a candidate for the area to be extracted is determined from the new compressed image.

Figure 13A:
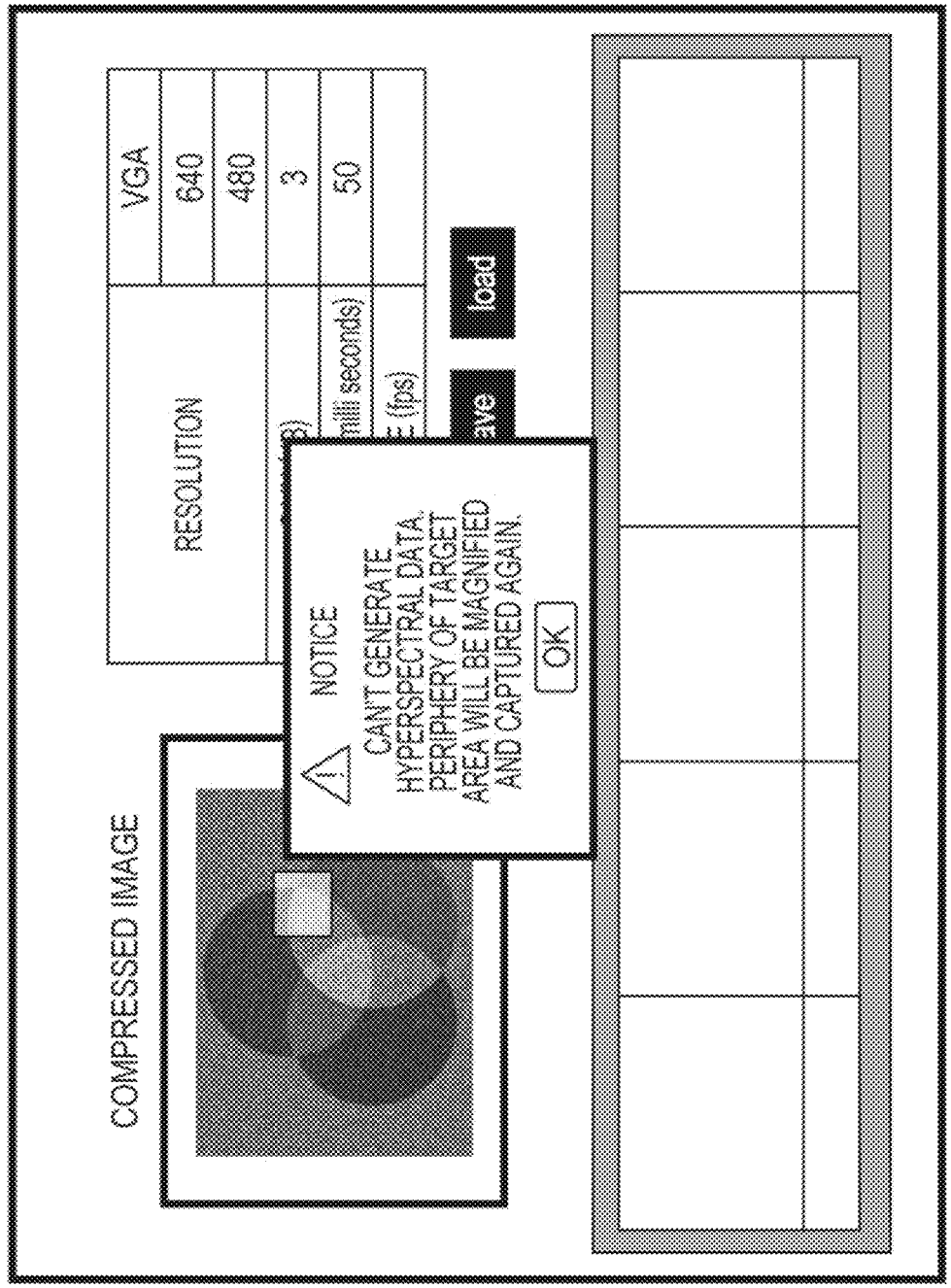
FIG. 13A is an image showing an example of an error screen.
Figure 13B:
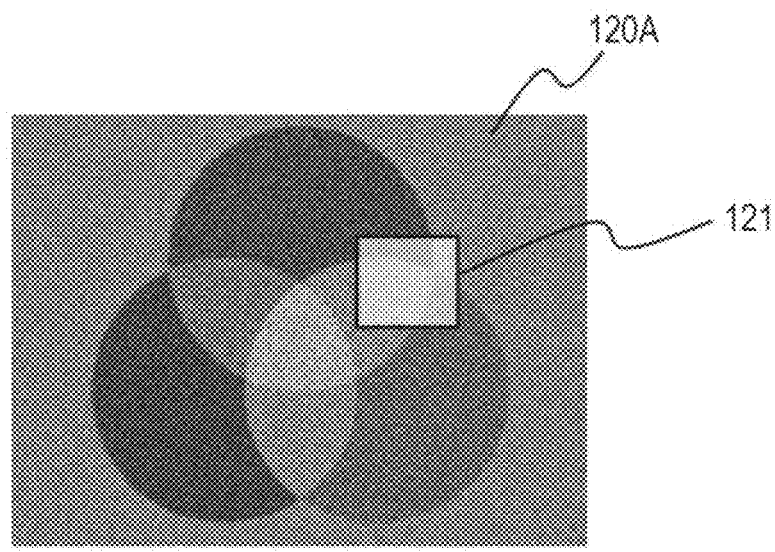
FIG. 13B is an image to explain an area magnification process.
Figure 13C:
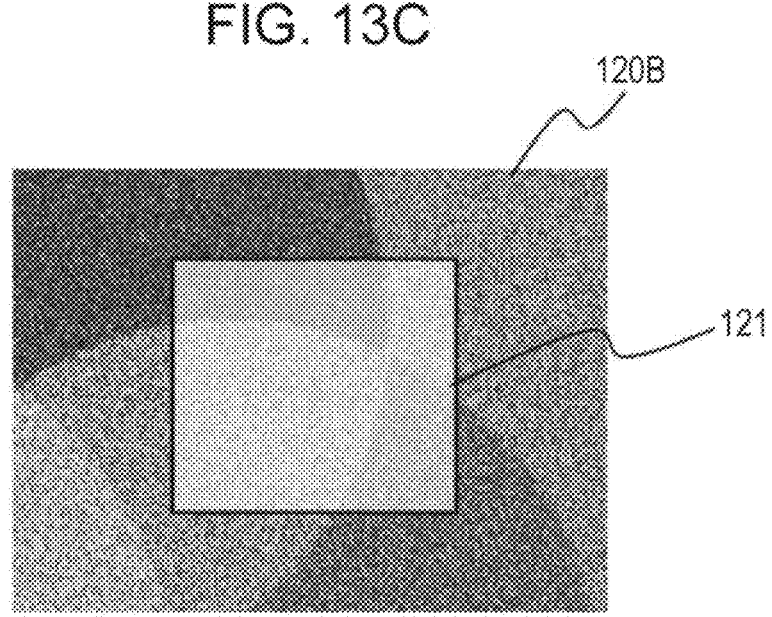
FIG. 13C is an image to explain an area magnification process.

FIG. 13A shows an example of an error screen displayed in step S114. In this example, an error message is displayed, which says that the extracted area is too small, and the periphery of a target area will be magnified and captured again. Here, "the periphery of a target area will be magnified and captured again" means that a new compressed image 120B as illustrated in FIG. 13C with a magnified periphery of the extracted area 121 is generated from an original compressed image 120A as illustrated in FIG. 13B, for example. The imaging device 100 generates a compressed image with a magnified periphery of a target area using a zoom function, for example.

In the example of FIG. 12, an automatically magnified compressed image is generated, but a compressed image may be generated by a manual operation of a user. In that case, after seeing an error message, a user operates the imaging device 100 to capture an object in an image with a magnified scale. Consequently, a compressed image with a magnified periphery of a target area is generated, and a hyperspectral image is generated based on the compressed image.

Figure 14:
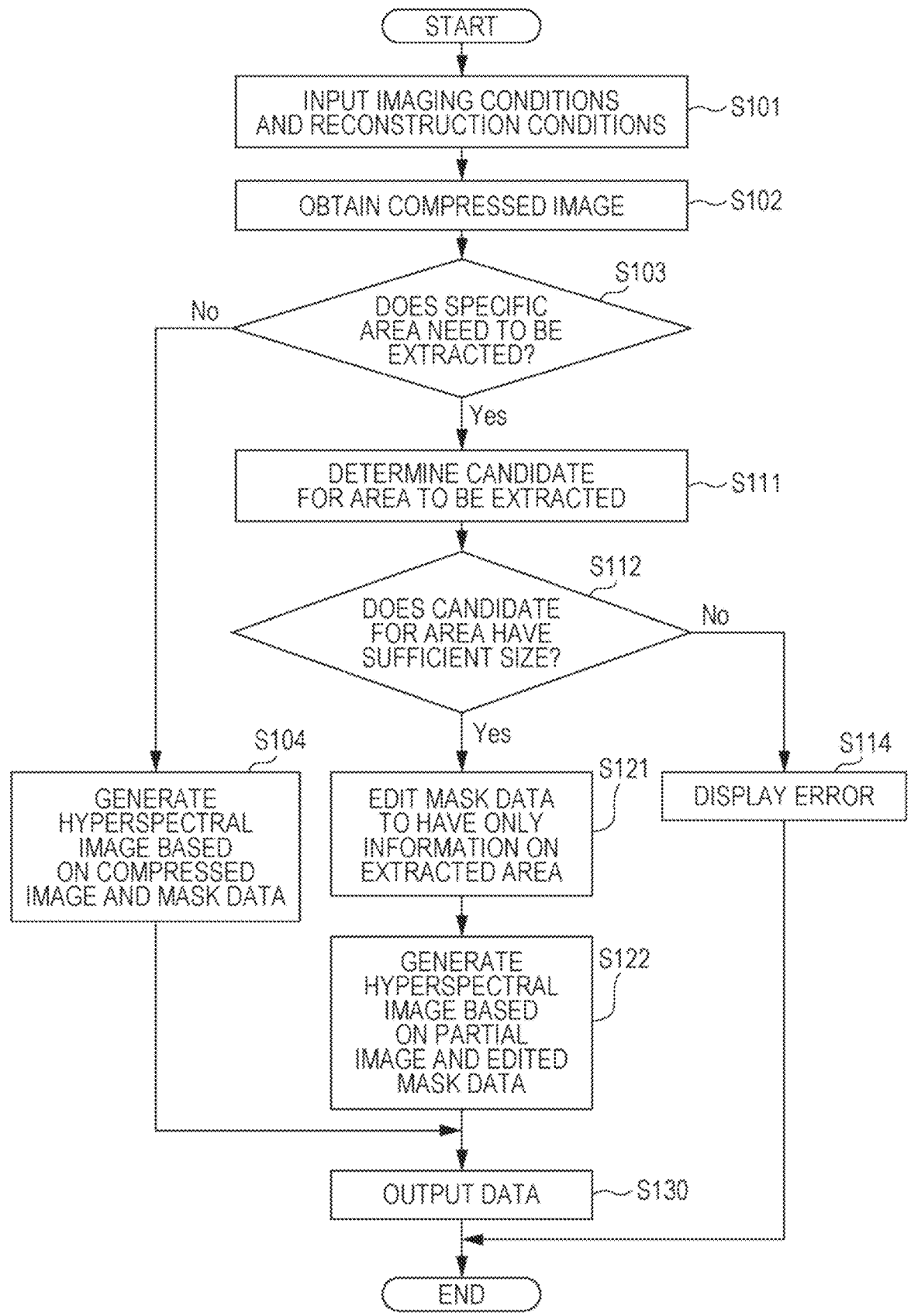
FIG. 14 is a flowchart showing the operation of an imaging system in the second modification.

FIG. 14 is a flowchart showing a modification in which when it is determined in step S112 that the extracted area does not have a sufficient size for calculation, an error is displayed in step S114, then the processing is completed, and a user is promoted to reset an area to be extracted.

Figure 15:
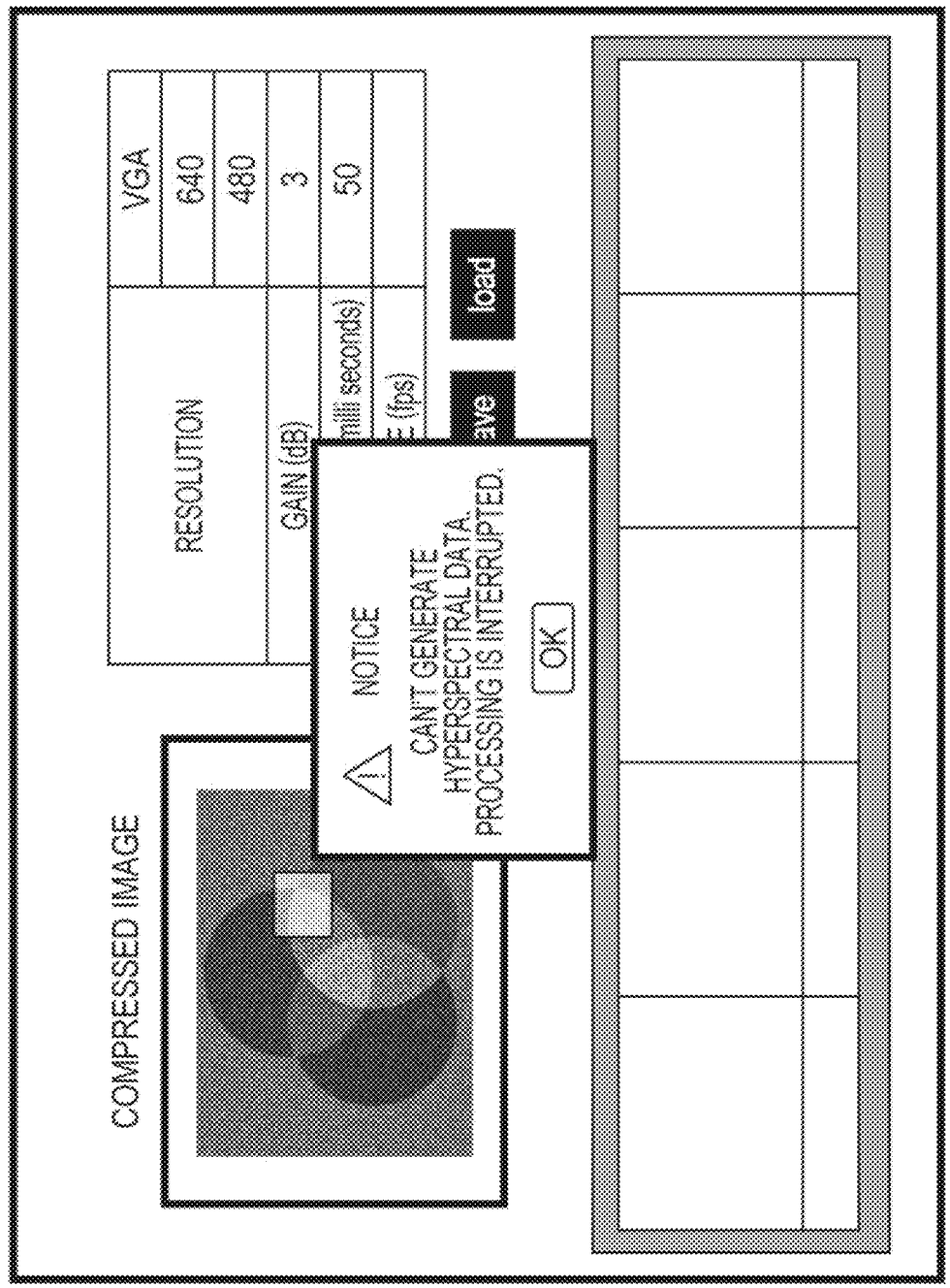
FIG. 15 is an image showing an example of an error screen.

FIG. 15 is an image showing an example of an error screen to be displayed. In this example, an error message is displayed, which says that hyperspectral data cannot be generated due to too small extracted area, thus, the processing is interrupted. Instead of the above message, another message may be displayed, which prompts a user to magnify the periphery of a target area and capture an image again.

Figure 16:
FIG. 16 is a picture to explain an example of determining, by edge detection, an area to be extracted from a compressed image.

FIG. 16 is a picture to explain an example of determining, by edge detection, an area to be extracted from a compressed image or a semi-compressed image in step S111 in FIGS. 8, 12, 14. In this example, in step S111, the signal processing circuit 250 detects an edge in the compressed image, and determines a candidate for the area to be extracted based on the detected edge. In the example of FIG. 16, buildings 201 and 202 are identified by detecting a structure surrounded by straight line segments. Decision as to whether reconstruction calculation is performed for the extracted area by edge detection may be left to a user. For example, on the GUI as illustrated in FIG. 10, a detected area may be displayed with a dotted line or a figure having a transmission rate higher than or equal to 1%, and a user may be allowed to manually determine the area as a target to be extracted. In this manner, in the example of FIG. 16, the signal processing circuit 250 detects an edge in a two-dimensional image represented by compressed image data, and extracts partial image data based on the detected edge.

Figure 17A:
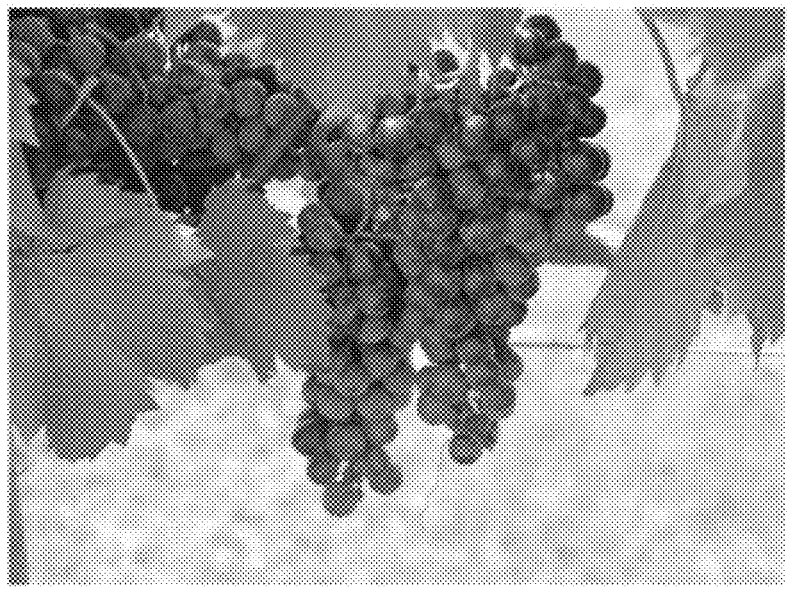
FIG. 17A is a picture to explain an example of determining, based on a result of color differentiation, an area to be extracted from a compressed image.
Figure 17B:
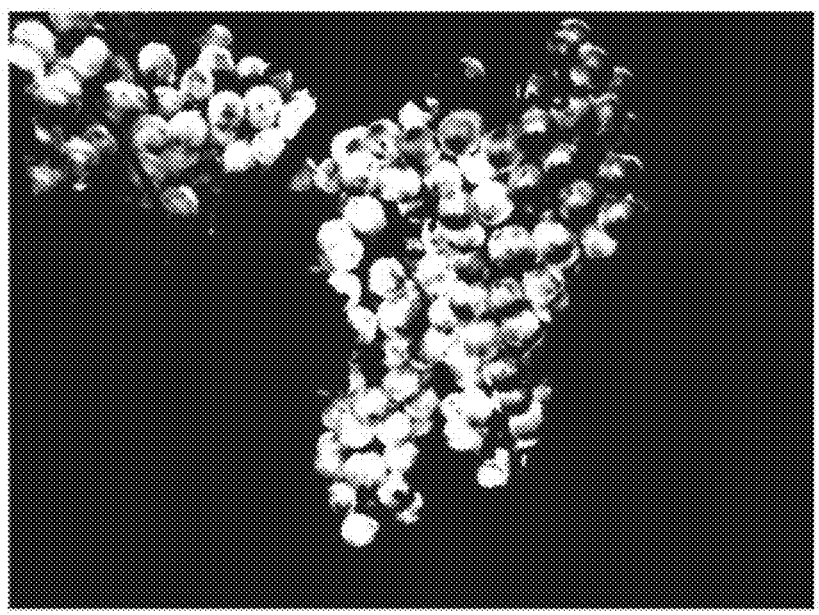
FIG. 17B is a picture to explain an example of determining, based on a result of color differentiation, an area to be extracted from a compressed image.

FIG. 17A and FIG. 17B are each a picture to explain an example of extracting an area based on a result of approximate color differentiation in step S111 in FIGS. 8, 12, 14. In this example, in step S111, the signal processing circuit 250 extracts luminance information on specific wavelength components from a compressed image or a semi-compressed image, and extracts a partial image based on the luminance information on specific wavelength components. For example, when a hyperspectral image of grapes growing in an orchard as illustrated in FIG. 17A is generated, a situation is assumed in which blue or purple clusters are growing surrounded by green leaves and brown branches. In this case, as illustrated in FIG. 17B, a hyperspectral image can be generated through selection of an area with information on clusters of grapes by extracting a portion with much luminance information on the wavelength range from blue to purple. In such a case, an image in the wavelength bands over the entire target wavelength range does not need to be generated, and only an image in part of the wavelength bands (for example, bands corresponding to purple to blue) may be generated. In this manner, in the example illustrated in FIG. 17A and FIG. 17B, the signal processing circuit 250 extracts luminance information on specific wavelength components from a compressed image, and extracts partial image data based on the luminance information on specific wavelength components.

Note that the configuration of the imaging device, the method of compressing hyperspectral information, and the algorithm of reconstructing three-dimensional hyperspectral data are not limited to those described above. For example, the arrangement of the filter array 110, the optical system 140, and the image sensor 160 is not limited to the arrangement illustrated in FIG. 1A to FIG. 1D, and may be modified as appropriate. In addition, the characteristics of the filter array 110 is not limited to the characteristics illustrated with reference to FIG. 2A to FIG. 4B, and the filter array 110 with optimal characteristics is used according to the application and purpose.

The technique in the present disclosure is useful, for example, for a camera and a measuring instrument that capture an image with multiple wavelengths. The technique in the present disclosure is also applicable to, for example, sensing of living body/medical care/beauty care, a residual agricultural chemical inspection system, a remote sensing system and an in-vehicle sensing system.

What is claimed is:

1. A signal processing method performed by a computer, the method comprising:
    obtaining first compressed image data including hyperspectral information and indicating a two-dimensional image in which the hyperspectral information is compressed, the hyperspectral information being luminance information on each of at least four wavelength bands included in a target wavelength range;
    extracting partial image data from the first compressed image data; and
    generating first two-dimensional image data corresponding to a first wavelength band and second two-dimensional image data corresponding to a second wavelength band from the partial image data, wherein the first compressed image data includes data of pixels, data of each of the pixels includes first information and second information which are superimposed on each other, and each of the first information and the second information corresponds to one of the at least four wavelength bands.

2. The method according to claim 1, wherein the first compressed image data is generated by an imaging device including: a filter array including several types of optical filters having different spectral transmission rates from each other; and an image sensor that obtains an image formed by light which passes through the filter array.

3. The method according to claim 2, further comprising obtaining mask data on which a spatial distribution of the spectral transmission rates of the filter array is reflected, wherein the first two-dimensional image data and the second two-dimensional image data are generated based on part of the mask data, corresponding to the partial image data, and the partial image data.

4. The method according to claim 1, further comprising causing a display device to display a graphical user interface that allows a user to specify an area in the two-dimensional image, to be extracted as the partial image data.

5. The method according to claim 1, further comprising detecting an edge of the two-dimensional image, wherein the partial image data is extracted based on the edge.

6. A signal processing method performed by a computer, the method comprising:

obtaining first compressed image data including hyperspectral information and indicating a two-dimensional image in which the hyperspectral information is compressed, the hyperspectral information being luminance information on each of at least four wavelength bands included in a target wavelength range;

extracting partial image data from the first compressed image data; and generating first two-dimensional image data corresponding to a first wavelength band and second two-dimensional image data corresponding to a second wavelength band from the partial image data, wherein the first compressed image data includes first information that is spatially encoded and second information that is spatially encoded, and each of the first information and the second information corresponds to one of the at least four wavelength bands.

7. A signal processing method performed by a computer, the method comprising:

obtaining first compressed image data including hyperspectral information and indicating a two-dimensional image in which the hyperspectral information is compressed, the hyperspectral information being luminance information on each of at least four wavelength bands included in a target wavelength range;

extracting partial image data from the first compressed image data;

generating first two-dimensional image data corresponding to a first wavelength band and second two-dimensional image data corresponding to a second wavelength band from the partial image data;

determining whether the partial image data is appropriate for generating the first two-dimensional image data and the second two-dimensional image data from the partial image data;

upon determination that the partial image data is appropriate for generating the first two-dimensional image data and the second two-dimensional image data from the partial image data, performing a first process; and upon determination that the partial image data is inappropriate for generating the first two-dimensional image data and the second two-dimensional image data from the partial image data, performing a second process different from the first process.

8. The method according to claim 7, wherein determination as to whether the partial image data is appropriate for generating the first two-dimensional image data and the second two-dimensional image data from the partial image data is made based on a number of pixels in the partial image data.

9. The method according to claim 8, wherein the second process is to increase the number of pixels in the partial image data.

10. The method according to claim 7, wherein the first compressed image data is generated by an imaging device including: a filter array including several types of optical filters having different spectral transmission rates from each other; and an image sensor that obtains an image formed by light which passes through the filter array, the second process is to generate second compressed image data by causing the imaging device to magnify and image an area corresponding to the partial image data, and the first two-dimensional image data and the second two-dimensional image data are generated based on the second compressed image data.

11. The method according to claim 7, wherein the second process is to cause a display device to display an error.

12. The method according to claim 7, further comprising causing a display device to display a graphical user interface that allows a user to input threshold data for determining whether the partial image data is appropriate for generating the first two-dimensional image data and the second two-dimensional image data from the partial image data.

13. The method according to claim 12, wherein the threshold data includes a parameter related to a number of pixels or a luminance error.

14. A signal processing method performed by a computer, the method comprising:

obtaining first compressed image data including hyperspectral information and indicating a two-dimensional image in which the hyperspectral information is compressed, the hyperspectral information being luminance information on each of at least four wavelength bands included in a target wavelength range;

extracting partial image data from the first compressed image data;

generating first two-dimensional image data corresponding to a first wavelength band and second two-dimensional image data corresponding to a second wavelength band from the partial image data; and extracting luminance information on a specific wavelength component from the first compressed image data, wherein the partial image data is extracted based on the luminance information.

15. A signal processing device comprising:
a processor; and
a memory that stores a computer program to be executed by the processor,
wherein the computer program causes the processor to execute a process comprising:
obtaining compressed image data including hyperspectral information and indicating a two-dimensional image in which the hyperspectral information is compressed, the hyperspectral information being luminance information on each of at least four wavelength bands included in a target wavelength range;
extracting partial image data from the compressed image data; and
generating first two-dimensional image data corresponding to a first wavelength band and second two-dimensional image data corresponding to a second wavelength band from the partial image data,
wherein the compressed image data includes data of pixels,
data of each of the pixels includes first information and second information which are superimposed on each other, and
each of the first information and the second information corresponds to one of the at least four wavelength bands.

16. An imaging system comprising:
the signal processing device according to claim 15; and
an imaging device that generates the compressed image data.

17. A non-transitory computer-readable recording medium storing a program causing a computer to execute a process comprising:
obtaining compressed image data including hyperspectral information and indicating a two-dimensional image in which the hyperspectral information is compressed, the hyperspectral information being luminance information on each of at least four wavelength bands included in a target wavelength range;
extracting partial image data from the compressed image data; and
generating first two-dimensional image data corresponding to a first wavelength band and second two-dimensional image data corresponding to a second wavelength band from the partial image data,
wherein the compressed image data includes data of pixels,
data of each of the pixels includes first information and second information which are superimposed on each other, and
each of the first information and the second information corresponds to one of the at least four wavelength bands.

* * * * *